US007266719B1

(12) United States Patent
LeCrone et al.

(10) Patent No.: US 7,266,719 B1
(45) Date of Patent: *Sep. 4, 2007

(54) HOST SYSTEM FOR MASS STORAGE BUSINESS CONTINUANCE VOLUMES

(75) Inventors: Douglas LeCrone, Foxboro, MA (US); Bruce A. Pocock, Titusville, FL (US)

(73) Assignee: EMC Corporation, Hopkinton, MA (US)

( * ) Notice: Subject to any disclaimer, the term of this patent is extended or adjusted under 35 U.S.C. 154(b) by 502 days.

This patent is subject to a terminal disclaimer.

(21) Appl. No.: 10/642,912

(22) Filed: Aug. 18, 2003

Related U.S. Application Data

(63) Continuation of application No. 09/039,020, filed on Mar. 13, 1998, now Pat. No. 6,631,477.

(51) Int. Cl.
*G06F 11/00* (2006.01)
(52) U.S. Cl. .............................................. 714/9; 714/7
(58) Field of Classification Search ...................... 714/9
See application file for complete search history.

(56) References Cited

U.S. PATENT DOCUMENTS

| | | | | |
|---|---|---|---|---|
| 3,704,453 A | * | 11/1972 | Blackwell et al. | 710/21 |
| 5,210,865 A | * | 5/1993 | Davis et al. | 714/6 |
| 5,435,004 A | * | 7/1995 | Cox et al. | 707/205 |
| 5,487,160 A | * | 1/1996 | Bemis | 711/114 |
| 5,574,851 A | * | 11/1996 | Rathunde | 714/7 |
| 5,615,352 A | * | 3/1997 | Jacobson et al. | 711/114 |
| 5,655,154 A | * | 8/1997 | Jain et al. | 719/310 |
| 5,809,224 A | * | 9/1998 | Schultz et al. | 714/7 |
| 6,067,199 A | * | 5/2000 | Blumenau | 360/48 |
| 6,209,059 B1 | * | 3/2001 | Ofer et al. | 711/114 |
| 6,216,211 B1 | * | 4/2001 | McBrearty et al. | 711/162 |
| 6,598,134 B2 | * | 7/2003 | Ofek et al. | 711/162 |

* cited by examiner

*Primary Examiner*—Gabriel Chu
(74) *Attorney, Agent, or Firm*—Krishnendu Gupta; Penelope S. Wilson

(57) ABSTRACT

A mass storage business continuance time maker function host system that allows one or more MVS mainframe hosts to have the time to: establish business continuation volumes to mirror the standard mass storage volumes; synchronize business continuation volumes with the standard volumes so that their contents are identical; split off a business continuation volume from its standard volume counterpart to make the business continuation volume available for other purposes; and enable a business continuation volume to be used to restore the contents of a standard volume—all without halting or disrupting the business applications using standard volumes. These and related services are provided in a transparent manner to a host mainframe by manipulating MVS format volume labels, volume tables of contents and indexes, catalog entries, data set names and similar mechanisms on mass storage devices connected to host mainframes using the MVS operating system.

19 Claims, 20 Drawing Sheets

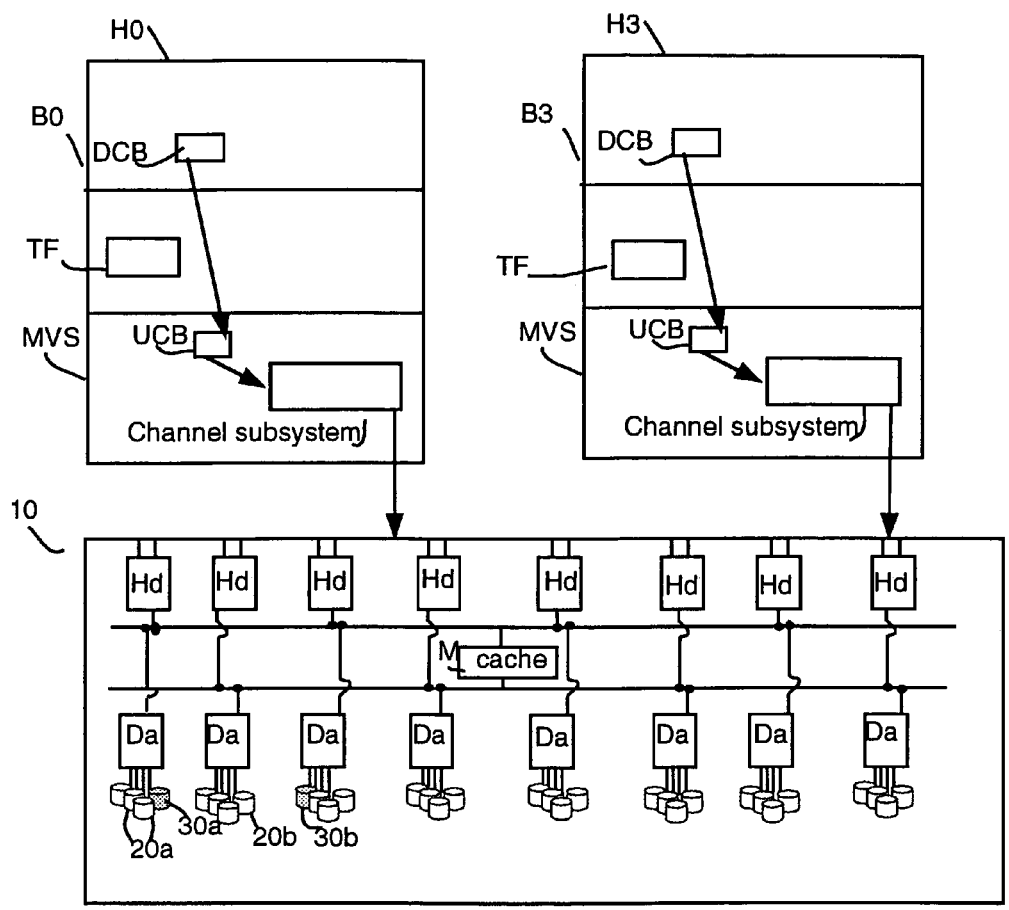

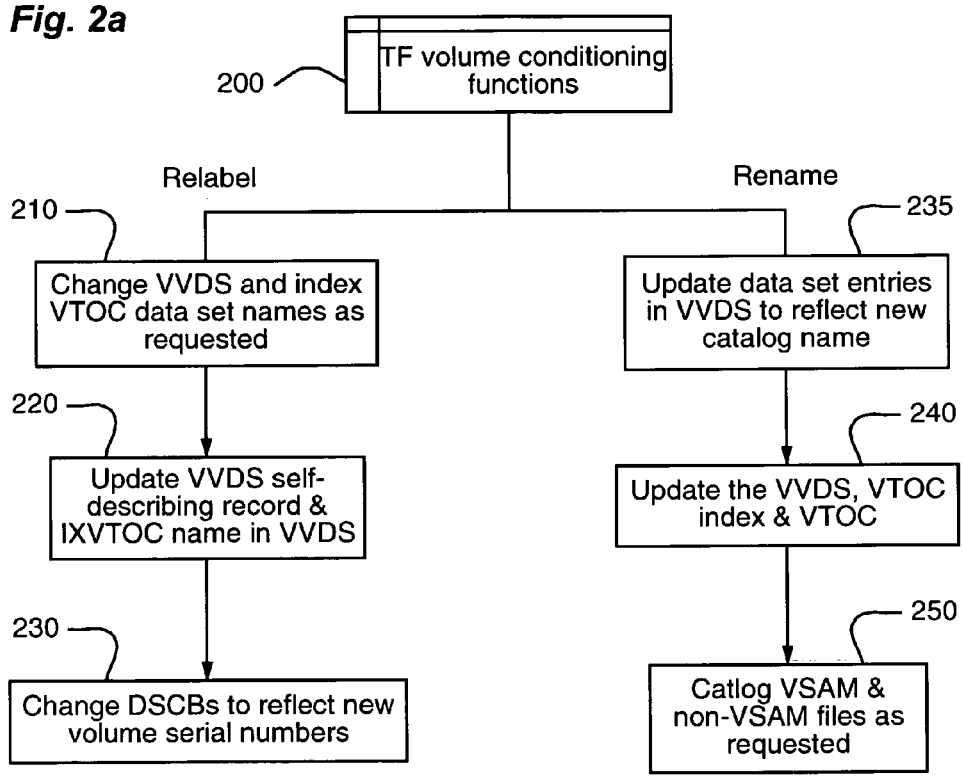

Fig. 3a

| | Action | seq# | cuup | cuus | WAIT |
|---|---|---|---|---|---|
| 802 | QUERY | 1-128 | n/a | required | n/a |
| 804 | ESTABLISH | 1-128 | required | required | y/n |
| 806 | RE-ESTABLISH | 1-128 | n/a | required | y/n |
| 808 | SPLIT | 1-128 | n/a | required | y/n |
| 810 | RESTORE | 1-128 | optional | required | y/n |

800

812

Command Syntax

The actions to be performed are defined in the SYSIN DDname file. An (*) in column one denotes a comment line.

* *cuu* specifies any device on the controller.

* *cuup* specifies a standard volume.

* *cuup-cuup* specifies a range of standard volumes.

* *cuus* specifies a BCV volume.

* *cuus-cuus* specifies a range of BCV volumes.

* DSN specifies a fully qualified VSAM or non-VSAM file. If the file spans multiple volumes, the action will be performed on all volumes.

* BCVgroup names may be used.

* *seq#* specifies a decimal number 1 to 128 that indicates in what order the specified command is executed, all actions on the same sequence level will be executed in parallel.

* WAIT/NOWAIT specifies the ability to wait for the completion of the action or to continue once the command is passed to the controller.

* Global command sets default values for WAIT, maximum return code (MAXRC), disable search when query issued; and debug.

Fig. 3b

902 This example establishes multiple BCVs, allows them to synchronize, splits them in preparation for backups, calls a userexit that will ask for an operator reply when the backups are complete, and resumes operation with the devices.

```
904        // EMCBKUP  JOB  (EMC), CLASS=A,MSGCLASS=X
           //*
           //***********************************
           //* PERFORM THE REQUESTED ACTIONS *
           //***********************************
           //*
906        // PROCACT    EXEC    PGM=EMCTF
908        // SYSOUT     DD      SYSOUT=A
910        // SYSIN      DD      *
912           GLOBAL             WAIT,MAXRC=4
914           QUERY              1,100
916           ESTABLISH          2,140,100
918           ESTABLISH          2,141,101
920           ESTABLISH          2,142,102
922           ESTABLISH          2,143,103
924           QUERY              3,100
926           SPLIT              4,140
928           SPLIT              4,141
930           SPLIT              4,142
932           SPLIT              4,143
934           QUERY              5,100
936           USEREXIT           6,WAITBKUP
938           RE-ESTABLISH       7,140
940           RE-ESTABLISH       7,141
942           RE-ESTABLISH       7,142
944           RE-ESTABLISH       7,143
946           QUERY              8,100
948        //*
```

Fig. 3c

1000     This example suspends a backup device, backs up a dataset, and re-establishes the backup device.

```
1002 // EMCBKUP    JOB     (EMC), CLASS=A,MSGCLASS=X
     //*
     //********************************
1004 //* SPLIT THE DEVICE'S*
     //********************************
     //*
1006 //SUSPEND   EXEC   PGM=EMCTF
     //SYSOUT    DD     SYSOUT=A
1008 //SYSIN     DD
1010 QUERY    1,100
1012 SPLIT    2,140
1014 QUERY    3,100
     //*
     //***************************
1016 //* RUN THE BACKUP *
     //***************************
     //*
1018 //BACKUP    EXEC   PGM=FDRDSF
     //SYSPRINT  DD     SYSOUT=*
     //SYSUDUMP  DD     SYSOUT=*
1020 //DISK1     DD     DSN=FDR.USE.UNIT0140,DISP=OLD,
                        UNIT=3390,VOL=SER=vvvvvv
1022 //TAPE      DD     DSN=tape.dataset.name,UNIT=TAPE,DISP=(,CATLG)
1024 //SYSIN     DD
1026         DUMP TYPE=DSF
1028         SELECT DSN=PAYROLL.**
     //*
     //************************************
1030 //* SYNCHRONIZE THE DEVICE'S
     //************************************
     //*
1032 //RESET     EXEC   PGM=EMCTF
     //SYSOUT    DD     SYSOUT=A
1034 //SYSIN     DD
1036 QUERY            1,100
1038 RE-ESTABLISH     2,140,NOWAIT
1040 QUERY            3,100
```

Fig.3d

```
1100 //JOB
1102 //EMCTFU  EXEC  PGM=EMCTFU
     //SYSOUT    DD  SYSOUT=*
1104 //TFINPUT DD *
1106 SIMULATE
1108 RELABEL CUU=100,OLD-VOLSER=TSO000,NEW-VOLSER=BCV000
1110 RELABEL CUU=101,OLD-VOLSER=TSO001,NEW-VOLSER=BCV001
1112 RELABEL CUU=102,OLD-VOLSER=TSO002,NEW-VOLSER=BCV002
1114 PROCESS VOLSER=BCV000
1116 PROCESS VOLSER=BCV001,VSAM
1118 PROCESS VOLSER=BCV002,NON-VSAM
1120 CATALOG CATALOG.DEFAULT,DEFAULT
1122 CATALOG CATALOG.TEMP,NEW,VOLSER=TS0001
1124 RENAME SYS,SYSBCV,CATALOG=CATALOG.TEMP
1126 RENAME TSO,TSO.ABC,CATALOG=CATALOG.TEMP
1128 RENAME USER,USERBCV
1130 RENAME USER1,USER1
     /*
```

Fig. 4a

1200 ESTABLISH seq#, cuus, cuup [,WAIT | ,NOWAIT]

or

1202 ESTABLISH seq#, cuus-cuus, cuup-cuup [WAIT | ,NOWAIT]

or

1204 ESTABLISH seq#, DSN= [,WAIT | ,NOWAIT] [,GROUP=]

Fig. 4b

1220 ESTABLISH 1,143,103

1224 ESTABLISH 1, 143-145, 103-105

1226 ESTABLISH 1, DSN=SYS1.PARMLIB

Fig. 4c

RE-ESTABLISH seq#, cuus [WAIT \ NOWAIT]

Fig. 4d

RESTORE seq#, cuus [,cuup] [,WAIT | NOWAIT] [,VERIFY (volser | FBADEV)] [,NOR1SYNC}

Fig. 4e

SPLIT seq#, cuus [,WAIT | NOWAIT] [,FORCE | NOFORCE]

Fig. 4f

QUERY seq#, cuu [,ALL | count]

Fig. 4g

USEREXIT seq#, load-module-name, p1, p2

| command code | data address | flags | reserved | count |

HOST SYSTEM FOR MASS STORAGE BUSINESS CONTINUANCE VOLUMES

This application is a continuation of U.S. patent application Ser. No. 09/039,020, filed Mar. 13, 1998, entitled HOST SYSTEM FOR MASS STORAGE BUSINESS CONTINUANCE VOLUME, now U.S. Pat. No. 6,631,477.

BACKGROUND OF THE INVENTION

1. Field of the Invention

The present invention relates generally to the field of computer mass storage systems such as multiple disk systems and libraries and more particularly to making time available for duplicating storage system contents for backup, recovery and other purposes without disrupting the business applications using the storage systems.

2. Background

More and more businesses have computer system operations that must continue to operate nearly continuously 24 hours a day, 7 days a week, 365 days a year, with little or no interruption to service, loss of system availability, or loss of data in mass storage. Many of these types of operations involve the use of huge databases, data sets or files stored on multiple disk systems. When files and data sets were only a few hundred thousand bytes or even a few megabytes in size, they could be backed up (read and copied in their entirety) in a few minutes. If a test update of the file caused errors in the new version, the old status quo could be restored to the storage system from a backup tape or disk in a few minutes. Similarly, updating the file often took only minutes. However, as disk capacity, and then multiple disk system capacity, such as that provided by Redundant Arrays of Independent Disks (RAID) systems and Hierarchical Storage Management (HSM) Systems, made it possible to store gigabytes of data, and then terabytes of data in larger and larger databases and data warehouses, tasks such as backup and restore, creating alternative versions of the data for new version testing, and so on can now take 6-12 hours or more to accomplish, even on powerful mainframe computer systems. For businesses that must be in continuous operation around the clock or nearly so, the sheer amount of the data that must be backed up for such purposes presents a difficult time problem.

If such a business application has to be stopped so that a backup can be made, six to twelve hours or more could be lost. Many of today's business applications cannot be halted or disrupted for this length of time. On the other hand, if the business applications are operating constantly and backups are not made, data security can be jeopardized if disasters or system failures destroy the current contents of databases and files. Thus, while backups become more critical for disaster recovery programs and alternative testing needs, time becomes less and less available for them in a production schedule.

At the same time that the inherent capacity of mass storage systems has been increasing dramatically, a number of other factors that provide reliability benefits to the system user may sometimes complicate the backup problems. For example, the likelihood of disk failures and data loss have been significantly reduced by RAID disk formatting and recording techniques such as mirroring, in which simultaneous mirror copies are created on disk of data sets and databases being updated. In the event of a failure of one disk, its mirror can be used immediately by the production business application program. Other RAID formats also help lower the risk of online disk failures and data loss. Applicants's Assignee EMC Corporation's Symmetrix 5xxx systems provide such reliability and availability benefits to users. Many of the business applications that require continuous operation and use of large databases also use mainframe computers, such as IBM's System 390 series computers and its MVS operating system. These provide additional availability and reliability features such as multiple paths to data sets, sophisticated disk control and access software such as System Managed Storage (SMS), VSAM, and data set control and cataloging features.

The advantage of using such technology is an improved ability to keep the business applications operating almost around the clock. However, even with mirrored disk volumes and alternate data paths, system administrators still need to make backup copies of databases and data sets for several different purposes. One such purpose is, as mentioned, disaster recovery. If the data center where a mass storage system is located is damaged or destroyed by an accident or natural disaster, the system administrator should be able to recreate all the key databases and data sets elsewhere from backups, so that business can be resumed as quickly as possible.

Another purpose for backups is to enable testing of new software or new versions of software. One of the best ways to complete the testing of new software features for a major business application is by using "live data" or close to it, but without risking the actual production data. Traditionally, this has been done by using a backup version of the real data file. A backup version is essentially another copy of the data on another storage device or devices.

Continuous or nearly continuous business operation by definition means that the business application should not be stopped, or quiesced, if possible, even to allow a full backup to be made, especially if the amount of data means backups will take hours to perform. The makers of database programs for large files have attempted to address the problems of backing up and restoring data by using incremental backups and transaction logs, that allow the user to make one "big" backup periodically and several smaller ones that only reflect what has changed. These may also be used in connection with transaction logs that let the database software recreate changes since some last specified incremental backup.

Even so, backups such as these can still take hours when the files are big enough. They are also limited to specific database or application programs. Legacy applications (programs originally written years or even decades ago but still in production use on computers) using large files may not have access to such programs.

One technique, known as a "side file" has been used by Above Technology and Veritas to address part of the problem. In this approach, instead of updating the main file, the host computer has a special driver that creates a separate file, called the side file, and copies data to be written to it, instead of to the main file. When the side file fills up, the contents of the side file can be copied into the main file and then the side file is reused. This can still cause some interruption to the main business application program however, in order to copy the side file to the main file. It is also usually not a complete backup, but only a partial one.

Another approach is a technique known as log-structured files. In this approach, a log-structured file storage system typically writes all modifications to disk sequentially in a log-like structure. This speeds up file writing and crash recovery. In this approach, the log usually has index-like data so that files can be read back from the log efficiently. All writes typically go to the end of storage. If the storage system saves the old blocks and a copy of all the pointers, it has a snapshot of the prior state before a write operation. Thus, the old view serves as a partial backup.

IBM in its RAMAC virtual array device also uses a log file structure to create a snapshot of the data. In this approach, a snapshot is simply the creation of a new view of the volume or data set being "snapped" by copying the pointers in the log file structure. None of the actual data is accessed, read, copied or moved. Any updates that are made to the snapshot will be effective for that view of the data; any other views remain unchanged.

These tend to be partial solutions, however. They may not be compatible with existing structures and control mechanisms in the MVS operating system or others or with the principal data set and access method formats used. They also do not provide a complete and convenient system for backing up and restoring data in an MVS mainframe environment without halting or disrupting the business operation at some point.

It is an object of this invention to provide a way to backup and restore data in a mainframe computer environment without halting or disrupting the business applications in process.

It is another object of the present invention to provide a method and apparatus for backing up and restoring data in mass storage systems that is compatible with the MVS operating system's control structures, storage formats and access methods.

SUMMARY OF THE INVENTION

These and other objects are achieved by a mass storage business continuance time maker function host system that allows one or more MVS mainframe hosts to: establish business continuation volumes to mirror the standard mass storage volumes; synchronize business continuation volumes with the standard volumes so that their contents are identical; split off a business continuation volume from its standard volume counterpart to make the business continuation volume available for other purposes, such as backup; and enable a business continuation volume to be used to restore the contents of a standard volume. These and related services are provided in a transparent manner to a host mainframe by manipulating MVS format volume labels, volume tables of contents and indexes, catalog entries, data set names and similar mechanisms on mass storage devices connected to host mainframes using the MVS operating system.

It is an aspect of the present invention that it enables host computers to find the time to manage business continuance volumes to provide for backups without disrupting business applications.

Another aspect of the present invention is that it operates with existing MVS file systems and structures.

Still another aspect of the present invention is that it operates with a variety of mass storage disk formatting structures, such as RAID mirroring, striping, parity striping, etc.

It is another aspect of the present invention that it allows for transparently reconnecting and restoring from backup files made according to its method and apparatus without taking time from business operations.

Yet another aspect of the present invention is that it provides its services while business applications continue to use the disks being copied or restored.

BRIEF DESCRIPTION OF THE DRAWINGS

FIG. 1b is a more detailed schematic block diagram of the present invention.

FIG. 2a is block diagram of the volume conditioning functions of the present invention.

FIG. 3a is a block diagram of command syntax according to the method and apparatus of the present invention.

FIG. 3b is an example of the use of the commands of the present invention.

FIG. 3c is another example of the use of the commands of the present invention.

FIG. 3d is an example of the use of the volume conditioning statements of the present invention.

FIGS. 4a through 4g are examples of syntax for individual commands of the present invention.

DETAILED DESCRIPTION OF THE INVENTION

Figure 1A:
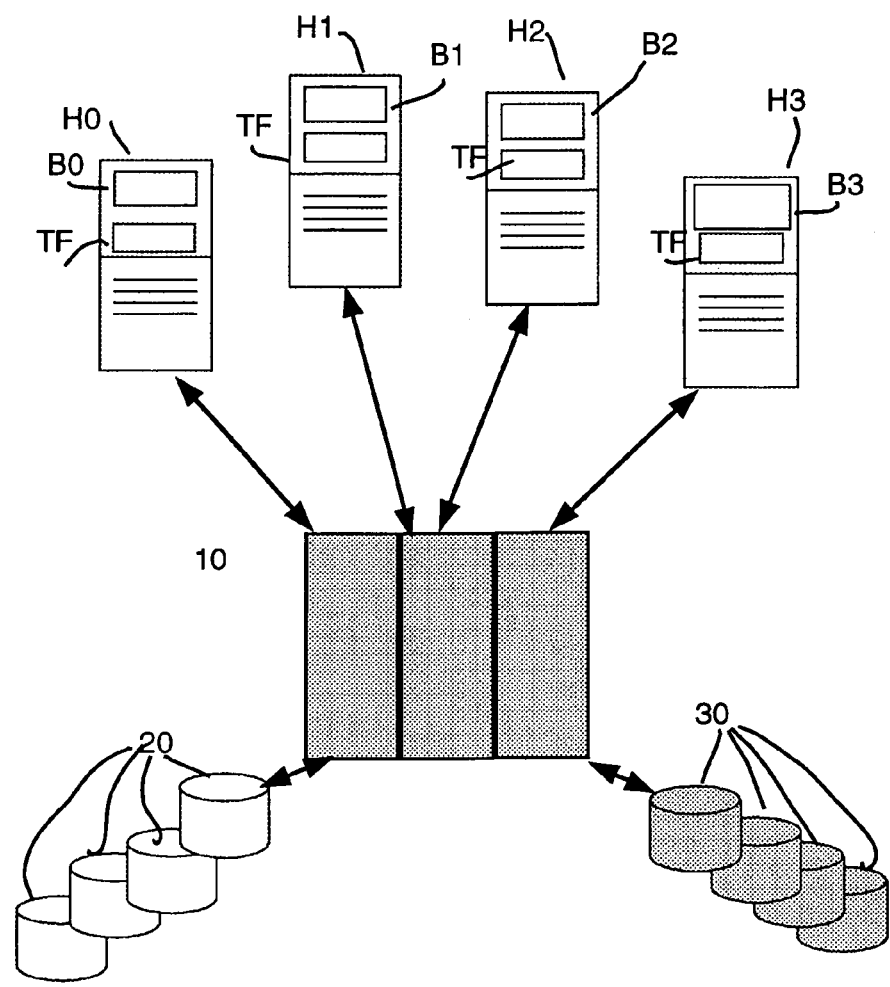
FIG. 1a is a schematic block diagram of the present invention.

In FIG. 1a, an overview of the present invention is shown. In a preferred embodiment, mass storage subsystem 10 is shown connected to four computer hosts H-H0, H1, H2, and H3. One or more hosts H, in a preferred embodiment, is a computer system using IBM's MVS operating system or a compatible equivalent thereof. Also in a preferred embodiment, mass storage subsystem 10 is a Symmetrix 5xxx system from EMC Corporation having business continuation features, as described in applicant's assignee's EMC Corporation's co-pending patent application Ser. No. 08/842,953 filed Apr. 25, 1997, entitled "Method and Apparatus for Independent and Simultaneous Access to a Common Data Set", which is hereby incorporated by reference. Mass storage subsystem 10, in turn, includes a number of disk volumes 20 and 30. For purposes of illustration, each host H is assumed to be running a business application B, (B0-B3). In a preferred embodiment, each host is also executing the time maker function TF of the present invention. In a preferred embodiment, hosts H connected to one or more of applicant's assignee's EMC Corporation's Symmetrix systems can be of various types, from hosts running the MVS operating system to hosts using open system operating systems such as UNIX™, or others.

Similarly, the devices shown in FIG. 1a that can be managed by mass storage subsystem 10 can be Count Key Data, (CKD) format devices (as used by the MVS operating system) or Fixed Block Architecture (FBA) devices as used by Unix or PC operating systems. Also in a preferred embodiment, applicant's assignee's EMC Corporation's Symmetrix systems are able to map logical volumes to physical volumes in a manner that is transparent to the host H. For example, the four logical volumes 20 in FIG. 1a might actually reside on only two physical volumes in mass storage subsystem 10.

Still in FIG. 1a, time maker function TF can be operated as a stand-alone batch utility program under the MVS operating system or as an online interactive program. Time maker function TF communicates with mass storage subsystem 10 and directs its actions for certain aspects of handling business continuance volumes.

In a preferred embodiment, mass storage subsystem 10 is initially configured to have some of its logical disk volumes designated as standard volumes 20 and some of its logical disk volumes designated as business continuance volumes (BCV's) 30. Also in a preferred embodiment, standard volumes 20 can be configured as disk volumes in any format normally provided by mass storage subsystem 10. For example, some standard volumes 20 could be mirrored RAID volumes, some could be parity striped RAID volumes, and so on. A preferred embodiment of mass storage subsystem 10 does require that some sort of disk mirroring feature be available. As mentioned, in a preferred embodiment, mass storage subsystem 10 also includes the ability to map two or more logical volumes onto a single physical disk volume in such a way that the Host H is not aware of the mapping.

Referring now to FIG. 1b, a more detailed partial view of the example of FIG. 1a is shown. In FIG. 1b, hosts H0 and H3 are seen connected to mass storage subsystem 10. Mass storage subsystem 10 appears to the MVS operating system as a controller and includes a number of host directors HD and disk adapters DA, for reading and writing volumes 20 and 30. In this example, each host H is a mainframe computer controlled by the MVS operating system. Those familiar with IBM mainframes and the MVS operating system are aware that application programs, such as business applications B0 and B3 executing in hosts H0 and H3 respectively, are logically and not physically connected to input/output (I/O) devices such as standard volumes 20a. When a business application is started, it uses MVS Job Control Language (JCL) to describe the type of devices it needs, and the names of specific files or data sets it wants to use or create. The operating system creates control blocks such as the Data Control Block or DCB that describe these data sets logically. When the data set is opened by business application B0, operating system MVS makes both logical and physical connections to one or more standard volumes 20 available to it. The DCB for a particular data set is linked logically through a Data Extent Block (DEB) not shown, to a Unit Control Block (UCB) which, in turn, can be linked logically to the MVS operating system's channel subsystem, which takes logical input/output requests and translates them into channel path selections to a particular device and ultimately, physical input/output signals for that device. Those skilled in the art will appreciate that other operating systems have similar mechanisms for separating the logical input/output requirements from the physical as this enables much more flexibility for configuring the hardware.

In a preferred embodiment of the present invention, time maker function TF is able to work without modifying the operating system to insure that the appropriate business continuance volume handling takes place in mass storage subsystem 10. This will be described in more detail below.

Figure 1C:
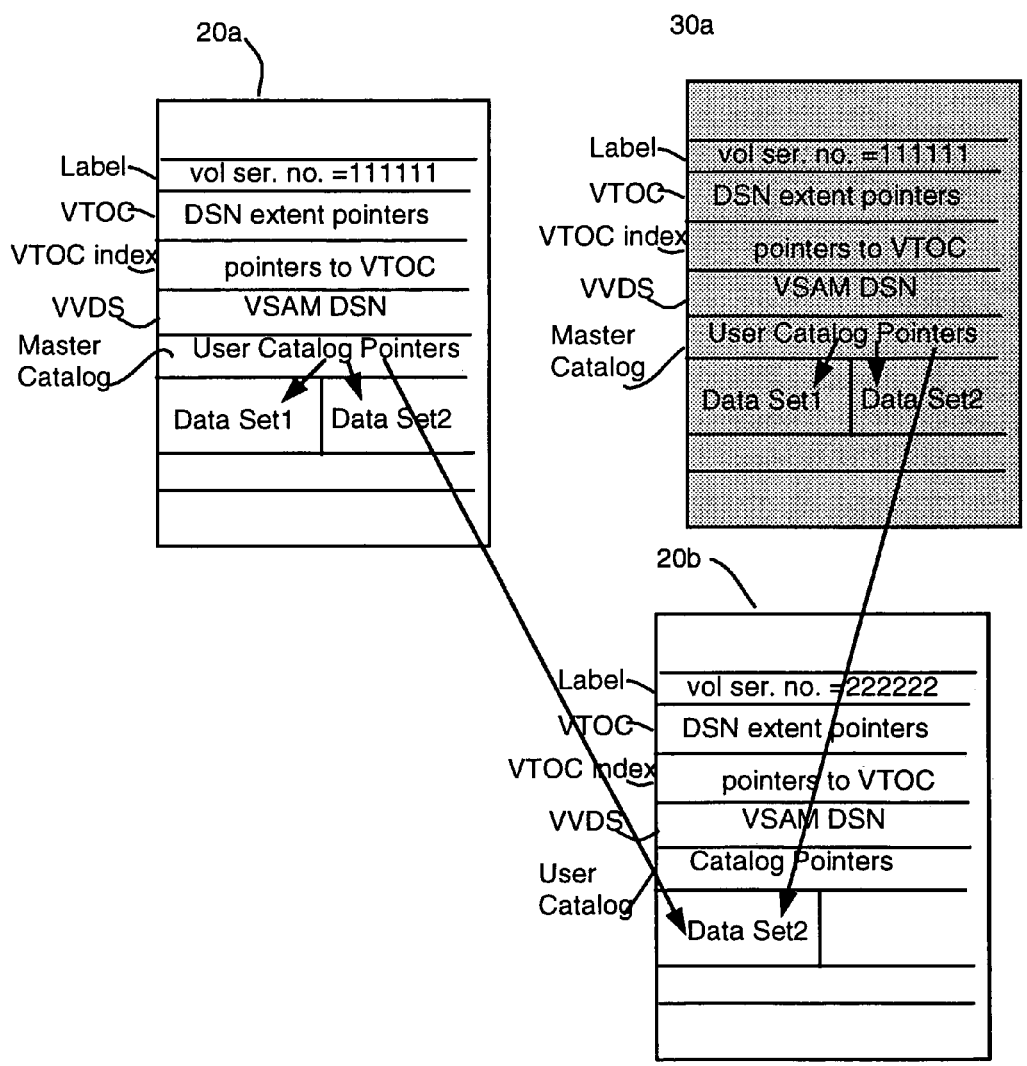
FIG. 1c is a block diagram of storage volumes according to the method and apparatus of the present invention.

With reference now to FIG. 1c, the logical format of a standard volume 20 for the MVS operating system is shown in volumes 20a and 20b. As shown there, a logical Direct Access Storage Device (DASD) volume known to the MVS operating system may include a volume label, a volume table of contents (VTOC), a VTOC index, for VSAM data sets and SMS volumes a VVDS, and a master catalog or a user catalog. Those skilled in the art are aware that in MVS, the VTOC indicates which contiguous areas (known as extents) of the volume are allocated, and contains data about each data set (the MVS term for file) on the volume. The records in the VTOC are known as Data Set Control Blocks (DSCBs). In the MVS operating system, use of the VTOC index creates a special data set on the volume to provide faster free space allocation and deallocation. In the volume label of every logical volume, such as standard volume 20, there is a volume serial number. In the MVS operating system, these serial numbers must be unique for devices that are online to a given host H.

As can be seen in FIG. 1c, however, when a BCV volume such as BCV volume 30a has been made part of a BCV pair with standard volume 20a (as will be described in more detail below) everything in it, including volume serial number, must be identical. Consequently, one of the functions performed by mass storage subsystem 10 for both volume mirroring and business continuance operations is that mass storage subsystem 10 handles the mirroring and business continuance functions in such a way that the operating system is only aware that one logical volume exists. In a preferred embodiment, time maker function TF also provides some controls to manipulate volume labels and volume serial numbers for business continuance purposes as is discussed in more detail below.

Figure 1D:
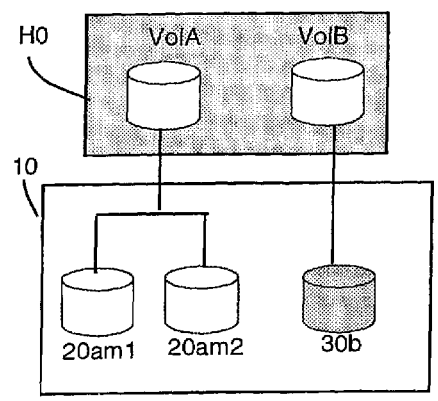
FIG. 1d is a block diagram illustrating storage volumes initially configured according to the method and apparatus of the present invention.

Ordinary mirroring is shown in FIG. 1d. In FIG. 1d, the logical volumes as the host sees them are shown in the box labeled H0. In this and the next few figures, the host recognizes two logical volumes by the volume serial numbers VolA and VolB. In a preferred embodiment, mass storage subsystem 10 actually stores the data for these volumes on its own logical volumes. Here, host H0 has asked that mirroring be done for the data on a logical volume with a volume serial number of VolA. Mass storage subsystem 10 assigns this logical volume to logical volume 20am1. To create a mirror disk for it, it assigns another logical volume 20am2. In a preferred embodiment, mass storage subsystem 10 maintains logical volumes 20am1 and 20am2 as mirror copies of each other, but host H0 and the MVS operating system work with logical volume serial VolA as though it were the only logical volume in use under that serial number.

A preferred embodiment of the present invention uses the same mirroring techniques to create a business continuance volume BCV 30b. In a preferred embodiment, any mirror structure can be used, such as normal mirroring, RAID, mirroring with applicant's Assignee's Symmetrix Remote Data Facilities (SRDF), and so on.

Figure 1E:
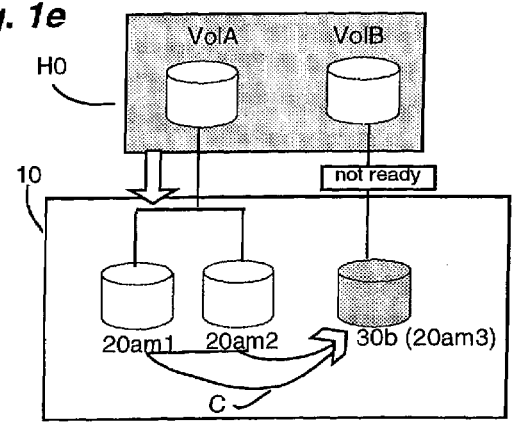
FIG. 1e is a block diagram illustrating the results of an establish command of the present invention.

The results of an establish BCV command of the present invention are shown in FIG. 1e. In FIG. 1e, time maker function TF (after checking the validity of such a request as is described in more detail below) instructs mass storage subsystem 10 to assign a BCV volume 30b for logical volume serial number VolA. Time maker function TF will cause mass storage subsystem 10 to set logical volume 30b as "not ready" to host H0 (and any other hosts H connected to mass storage subsystem 10). Mass storage subsystem 10 then assigns BCV volume 30b as the next available mirror for standard volume 20a. As shown in this example, a BCV volume can be the second, third, fourth, or nth mirror of the standard volume, as the internal design of mass storage subsystem 10 permits. This assignment of the BCV volume to mirror status enables mass storage subsystem 10 to copy the contents of standard mirror volume 20am1 or 20am2 to BCV volume 30b(20am3) as shown by the arrow C in FIG. 1e. While the copying is taking place, it is transparent to host H0, which may continue to make I/O requests to logical volume VolA.

In a preferred embodiment, mass storage subsystem 10 can use shared memory M, of FIG. 1b to store any pending writes that might affect the copying. Returning to FIG. 1e, when the copying is complete and BCV volume 30b(20 am3)'s contents are identical to those of standard volume 20am1 and 20am2, BCV volume 30b(20am3) is now synchronized with standard volumes 20am1 and 20am2 and capable of working as a business continuance device. It is an aspect of a preferred embodiment using EMC Corporation's Symmetrix 5xxx mass storage subsystems, and the above-described co-pending application that this copying is transparent to and not disruptive of the business application B0 running on host H0 which is reading and writing data to logical volume serial VolA at the same time. In other words, time maker function TF causes mass storage subsystem 10 to make a backup copy without interrupting normal processing or taking time away from the business application B0.

Figure 2B:
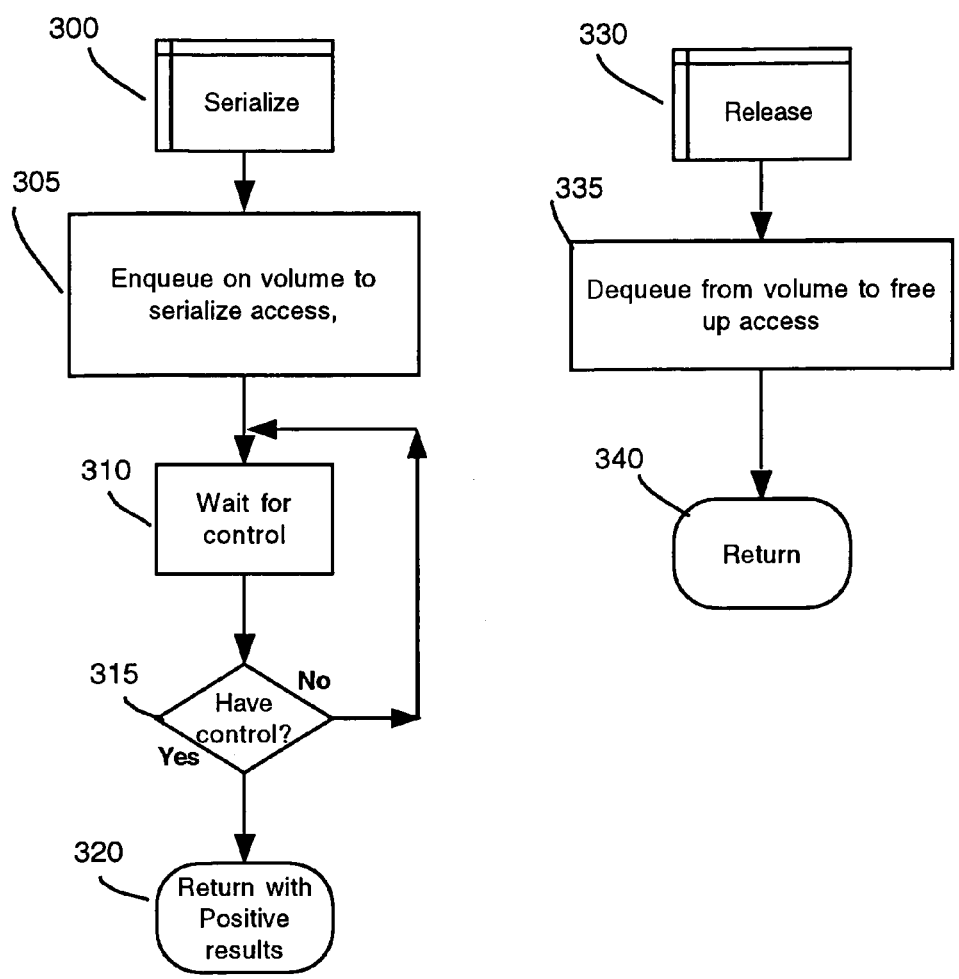
FIG. 2b is a flow diagram of serializing feature used by the present invention.
Figure 2C:
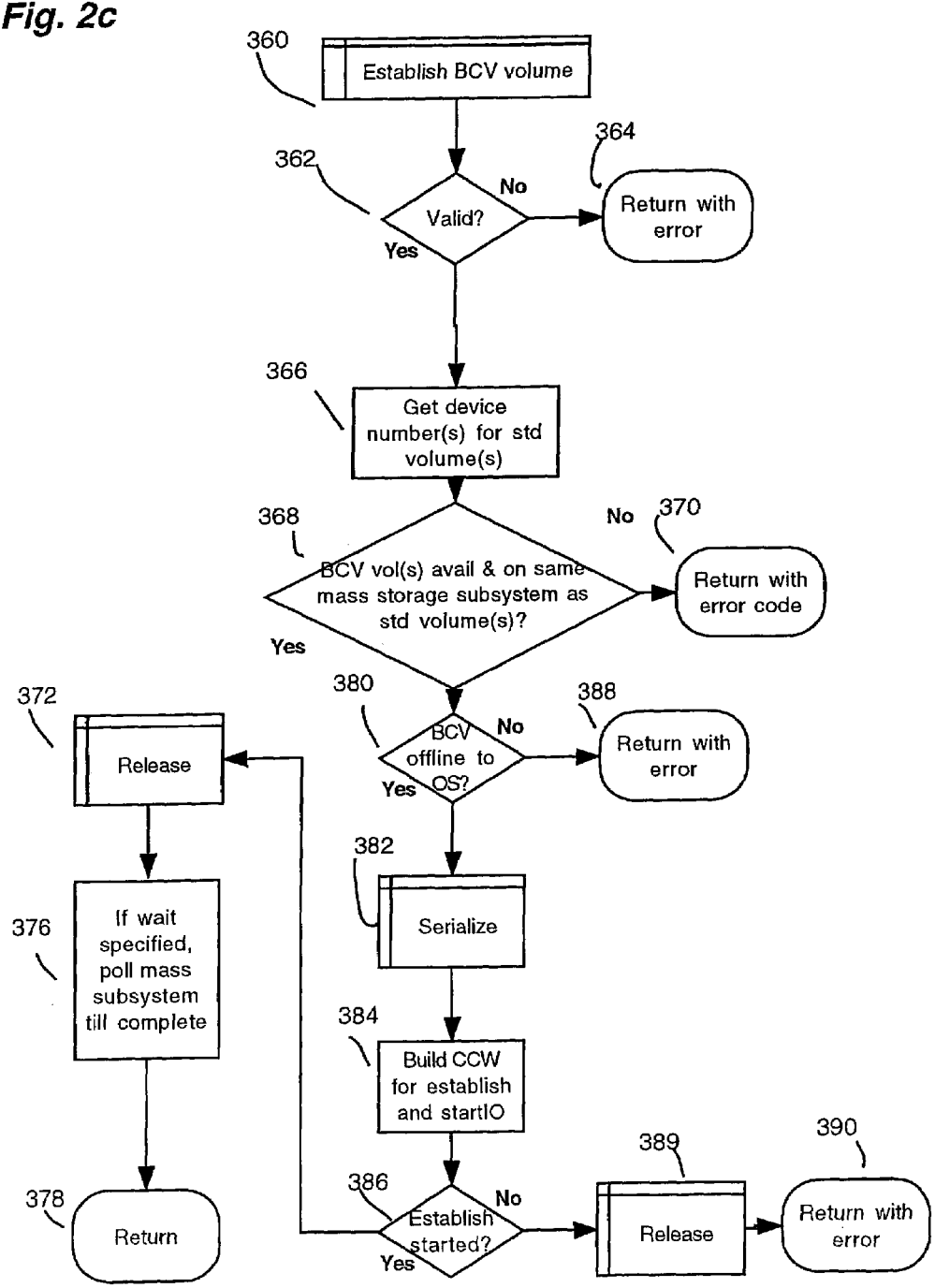
FIG. 2c is a flow diagram of the establish command of the present invention.

A flow diagram of the establish BCV command of the present invention is shown in FIG. 2c. After an establish BCV command has been presented, at step 360, validity checking is done on the command, its syntax and the requested actions at step 362. For example, in a preferred embodiment, mass storage subsystem 10 verifies that the logical BCV volume designated in the command is at least as large as the standard volume specified in the command, that the volume specified as the BCV volume has already been initialized as a BCV volume, that the standard volume does not already have a BCV device assigned to it, and so on. Similarly, as is described in more detail below, each command has a syntax that must be followed. If any errors are detected at step 362, the establish BCV command returns at step 364 with an appropriate error code, indicating the nature of the error.

Still in FIG. 2c, if the establish BCV command is valid, the present invention proceeds to step 366 to get the device number for the standard volume from mass subsystem 10.

Next, at step 368, the present invention checks to see if the BCV volume is available and is on the same mass storage subsystem 10 as the standard volume is. If it is not, an error code is returned at step 370. If it is, the present invention checks at step 380 to see if the BCV volume is set offline to the operating system. If it is not, an error is returned at step 388. Next, at step 382, the present invention serializes access to the BCV volume (as described below and shown in FIG. 2b) and then builds a channel command word CCW for an establish operation and issues a startio command at step 384.

In a preferred embodiment, this startio command of FIG. 2c will cause the channel command word to be sent through the MVS operating system's channel subsystem to mass storage subsystem 10. Mass storage subsystem 10 receives the command and assigns that BCV volume as the next available mirror for the standard volume. Mass storage subsystem 10 will start copying the contents of the standard volume to the BCV volume. Once mass storage subsystem 10 has received and begun acting on the establish request, it sends a return to the host.

Time maker function TF checks at step 386 of FIG. 2c to see if this has been received. As is described in more detail below, in a preferred embodiment, the user of time maker function TF commands can specify either that time maker function TF is to wait until the copying is complete or that time maker function TF can simply return once the copying has been initiated. In either case, time maker function TF releases the BCV volume at step 372. In a preferred embodiment, if a wait had been specified, time maker function TF will poll mass subsystem 10 at step 376 at 5 second intervals until the establish is complete and the entire contents of the standard volume have been copied to the BCV volume. If no wait was specified, time maker function TF returns at step 378. Those skilled in the art will appreciate that shorter or longer intervals could be used for the polling, as desired. Similarly, while the wait option is available in a preferred embodiment, those skilled in the art will appreciate that it could be omitted, if desired.

In a preferred embodiment, once a BCV volume has been synchronized by mass storage subsystem 10, it is considered part of a BCV pair, and any new data written to the standard volume of such a pair is also written to the BCV volume of the BCV pair by mass storage subsystem 10. In a preferred embodiment, the BCV volume will continue to be marked as "not ready" for any hosts H which use mass storage subsystem 10 as long as it is a part of a BCV pair.

A query feature, as is described in more detail below, allows the user to get time maker function TF to determine the status of any BCV volume. Thus, the query feature can be used to find out if the BCV volume 30b of FIG. 1e has been synchronized and is a fully operating part of a BCV pair. If it is, it now represents a complete copy or backup of the data on standard volume 20a. However, since, as a member of a BCV pair it has been marked by mass storage subsystem 10 as not ready or not available to any of the hosts H attached to mass storage subsystem 10, it cannot be used for reading and writing, or other commands from the host which rely on the device being in a ready state.

Figure 1F:
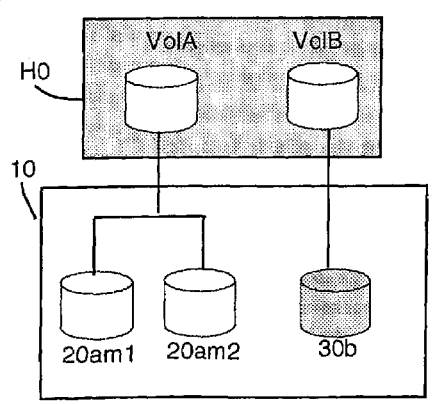
FIG. 1f is a block diagram illustrating the results of a split command of the present invention.

Turning now to FIG. 1f, the result of the split command of the present invention is shown. The split command allows the user to stop the mirroring operation and frees up the new copy of the data for other purposes, such as testing or restore operations. As seen in FIG. 1f, and described more fully below, time maker function TF sends a split request to mass storage subsystem 10. In a preferred embodiment, the response to this request suspends any I/O to the BCV volume 30b of the BCV pair, changes its device state to ready, enables access to it from any host H, while still containing the volume serial number which is the duplicate of the standard volume. The device is still offline, after the split since it was marked offline in order to originally establish or restore the volume. Mass subsystem 10 flags any new writes to the standard volume that occur after the split (in case the BCV is re-established later) and resumes normal operations. New writes to the BCV volume are also flagged, after the split so that when a re-establish or incremental restore is done, mass storage subsystem 10 can compare the changes to both volumes and refresh the tracks that have changed.

In a preferred embodiment of the split command there is an option to change the volume serial number. If user has requested this, time maker function TF will change it after the split, but the device will remain offline. After a split, time maker function TF can also partially condition the volume, as described more fully below.

Thus, as a result of the split feature, the contents of BCV volume 30*b* are now available for use in testing, backups to other media or other applications on any of the hosts H connected to mass storage subsystem 10. For example, even though BCV volume 30*b* is already a disk backup of the data on standard volume 20*a*, the user may also want to create a backup on magnetic tape for use in off-site disaster recovery.

Figure 2D:
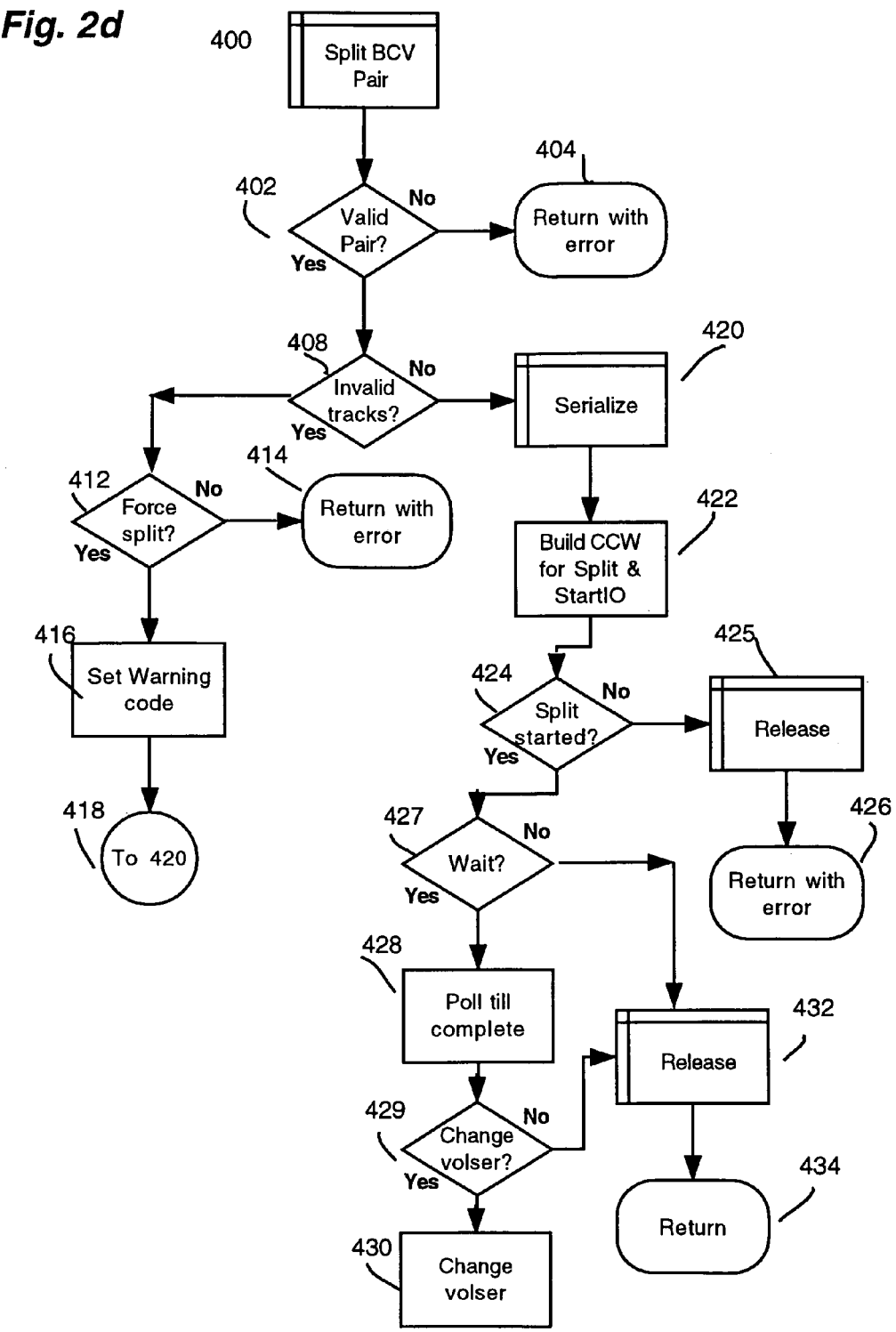
FIG. 2d is a flow diagram of the split command of the present invention.

Referring now to FIG. 2*d*, a flow diagram of the split command is shown. When a split BCV pair request is received at step 400, the present invention proceeds to check the validity of the split command at step 402. In a preferred embodiment, time maker function TF checks the syntax of the parameters specified for the command and uses mass storage subsystem 10 to insure that the standard volume has an active BCV mirror, that the standard and BCV volumes specified by the user in the command do, in fact, comprise a BCV pair. If one or more errors are found, time maker function TF returns at step 404 with an appropriate error code.

Still in FIG. 2*d*, time maker function TF next checks at step 408 to see if there are any invalid tracks on the BCV volume (an indication that an establish or re-establish did not complete.) If invalid tracks were found, time maker function checks at step 412 to see if a force split had been specified. If not, an error return is made at step 414. If one was requested, a warning code is set at step 416, and time maker function TF proceeds to step 420 to serialize access to the BCV pair.

Referring briefly to FIG. 2*b*, the serialization steps are shown following such a request at step 300. In a preferred embodiment, time maker function TF issues an MVS ENQ supervisor call to lock out access by any other copies of time maker function TF which might be executing in the host. At step 310, time maker function TF waits for control to return to it from the ENQ supervisor call, indicating the resource is now serialized. When it receives this control, processing proceeds as shown in FIG. 2*d*. Those skilled in the art will appreciate that this serialization does not affect other programs or applications executing in this host H or any other hosts. As will be apparent to those skilled in the art, serialization does not need to be done, as duplicate copies of time maker function TF would simply encounter error conditions without it. It simply provides a cleaner implementation and prevents unnecessary reruns due to errors.

Returning to the split command in FIG. 2*d*, once access has been serialized, a channel command word for the split function is built and a startio command using it is issued at step 422. This causes the MVS channel subsystem to send the command to mass storage subsystem 10. Upon receipt of a split request, mass storage subsystem 10 suspends any input/output to the BCV volume of the BCV pair specified by the user as the pair to be split and the BCV volume is set ready to the host. Mass storage subsystem 10 splits the specified BCV pair and causes new writes that are sent to the standard volume after the split to be flagged. New writes to the BCV volume of the pair are also flagged after a split.

Still in FIG. 2*d*, at step 424 in a preferred embodiment, time maker function TF verifies that the split has been started and proceeds to step 427, to see if the user has requested a wait for completion. If the user has, time maker function TF polls mass storage subsystem 10 until the split function is complete. If no wait has been requested, time maker function TF proceeds to release the access at step 432 and return at step 434. At step 429 a check is made to see if a volume serial change was requested, and if yes, at step 430 time maker function TF changes the volume label of the BCV volume which has been split. In a preferred embodiment, the invention changes the volume serial number to one specified by the user so it will be recognized by a host which will use the BCV volume for testing or other purposes. At this point, the present invention could also cause the split BCV volume to be varied back online to that host, but in preferred embodiment it does not do so.

Once the volume serial label changes have been completed, time maker function TF will release the BCV volume, as seen in the flow diagram of FIG. 2*d*, at step 432, and then returns at step 434.

Figure 1G:
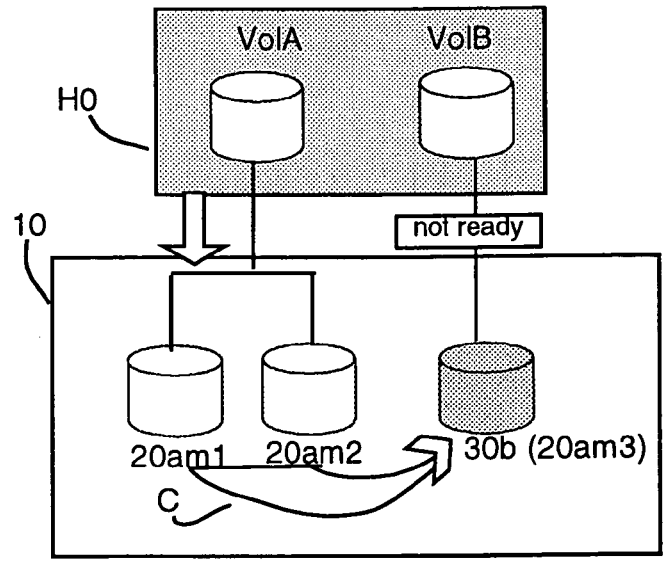
FIG. 1g is a block diagram illustrating the results of a re-establish command of the present invention.

As mentioned above, once a BCV pair has been established and then split, mass storage subsystem 10 flags all new writes to the standard volume and BCV volume so that if the user wishes to re-establish the BCV volume as part of a BCV pair, this is done in the same way as an initial establish, except that only the data that has been changed since the split needs to be copied. This means that a re-establish operation is usually a much faster operation than an initial establish. FIG. 1*g* shows the result of a re-establish command.

Figure 2E:
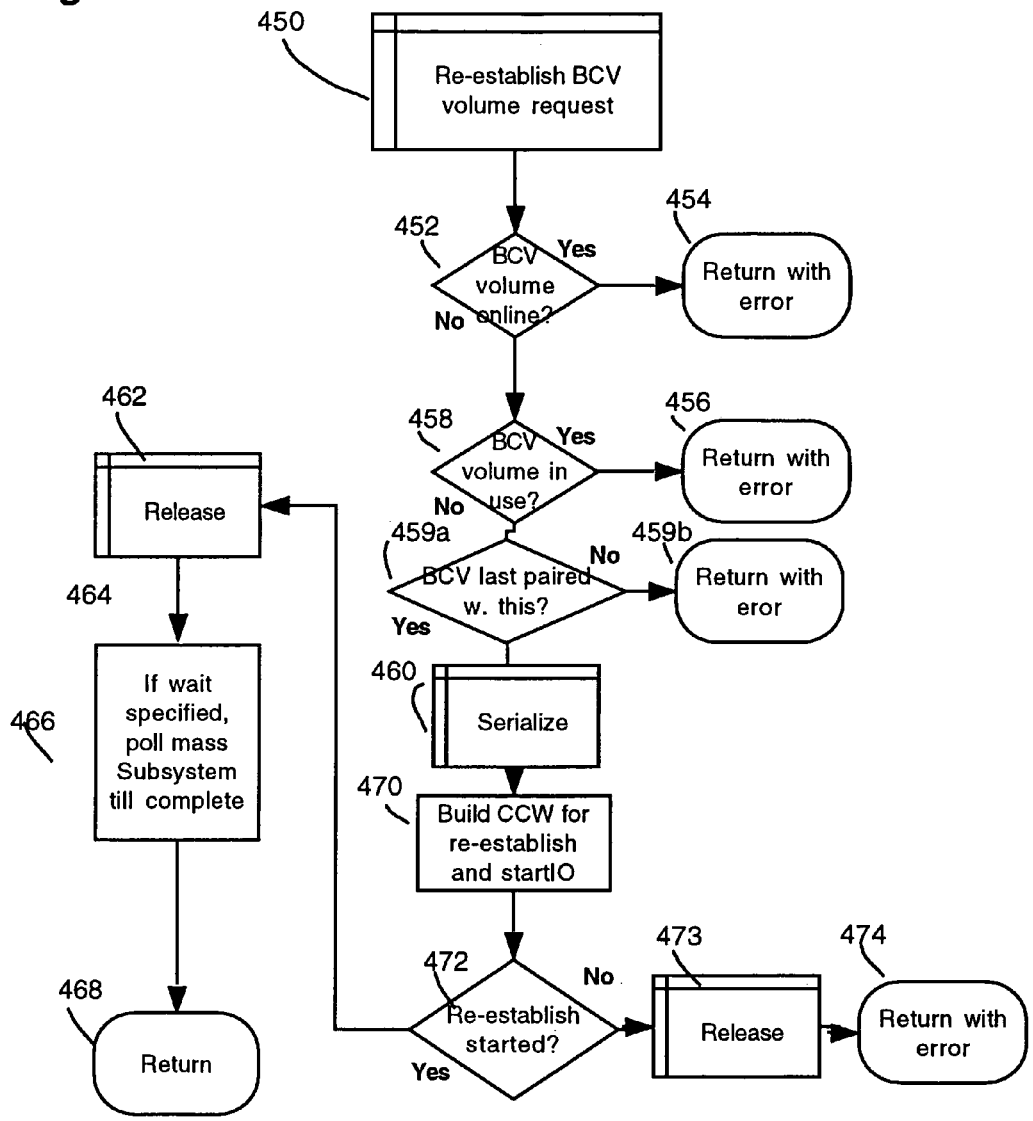
FIG. 2e is a flow diagram of the re-establish command of the present invention.

The flow diagram of FIG. 2*e* also illustrates the re-establish process. At step 450, a re-establish request has been received by time maker function TF, which validity checks the command at step 452. In a preferred embodiment, time maker function TF checks the syntax of the user specified devices and also causes mass storage subsystem 10 to verify that the BCV volume and the standard volume are at least the same size, and had been previously paired. If the BCV volume is online, as determined at step 452, this is also an error and a return with error code is made at step 454. If the BCV volume specified by the user in the re-establish requested is found to be in use at step 458, it is also an error, and a return with error is made at step 456. Next, at step 459*a*, time maker function TF checks to see if this BCV volume was last paired with this standard volume. If it was not, an error return is made at step 459*b*. If it was, processing proceeds.

Still in FIG. 2*e*, once it has been determined that the BCV volume identified for this re-establish request is offline and not in use, and was properly last paired, serialized access to it is obtained at step 460. At step 470, a channel command word CCW for a re-establish function is built and sent to mass storage subsystem 10 with a startio command. Next, at step 472, time maker function TF checks to see if mass storage subsystem 10 has acknowledged that the re-establish command has successfully started. If it did not, access is released at step 473 and an error is returned at step 474. If the command was started, time maker function TF releases access at step 462 and then checks, at step 466, to see if the user had requested a wait for completion. If the wait option was requested time maker function TF, in a preferred embodiment, polls mass storage subsystem 10 to determine whether the re-establish has completed.

For a re-establish command, processing in mass storage subsystem 10 is similar to that for the establish command, above, except that mass storage subsystem 10 copies to the BCV volume the new data that was written to the standard volume since the BCV pair was split, and also copies from the standard volume any other tracks that had been changed on the BCV volume after the split. As was mentioned above, new writes to both types of volumes have been flagged by mass storage subsystem 10 since the split. Consequently, once the re-establish is complete the contents of both volumes are identical again.

The re-establish command of the present invention is useful for situations in which the data resulting from the use of the BCV volume after a split was not useful or if a newer, fresher copy is needed. For example, if the data on the BCV volume was a backup of a transaction database being checked for potential leap year date problems, a later version of the data may have more records with expiration dates closer to the leap year that present potentially triggering events. The re-establish command allows the user to make a newer backup copy, and then, by using the split feature, to break it off and make it available for testing. The re-establish command is also likely to take much less time than an establish command, since it is probable that in most cases, the amount of new data written to the standard volume and the number of changes to a BCV volume since a split are likely to be much less than the full size of the volume.

Figure 1H:
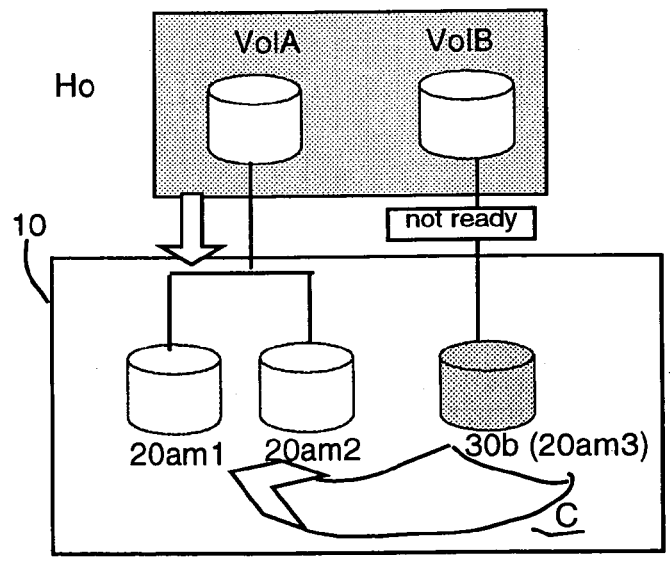
FIG. 1h is a block diagram illustrating the results of a restore command according to the method and apparatus of the present invention.

The restore feature, the results of which are seen in FIG. 1h, is the logical opposite of an establish or re-establish function. When the user requests a restore, time maker function TF serializes access (as described above) and sends the restore request to mass storage subsystem 10. In a preferred embodiment, mass storage subsystem 10 sets the BCV volume not ready to any host, assigns it as the next available mirror of the standard volume, and copies the contents of BCV volume 30b, as seen in FIG. 1h, to standard volume 20a and all its mirrors, overwriting the present data on those volumes. In FIG. 1h, logical volume VolA is two mirrors, 20am1 and 20am2. Both of these would be overwritten with the contents of BCV volume 30b in a restore operation, until all three contain identical data. Afterwards, any new data that is written to standard volume 20 is written to BCV volume 30b.

Figure 2F:
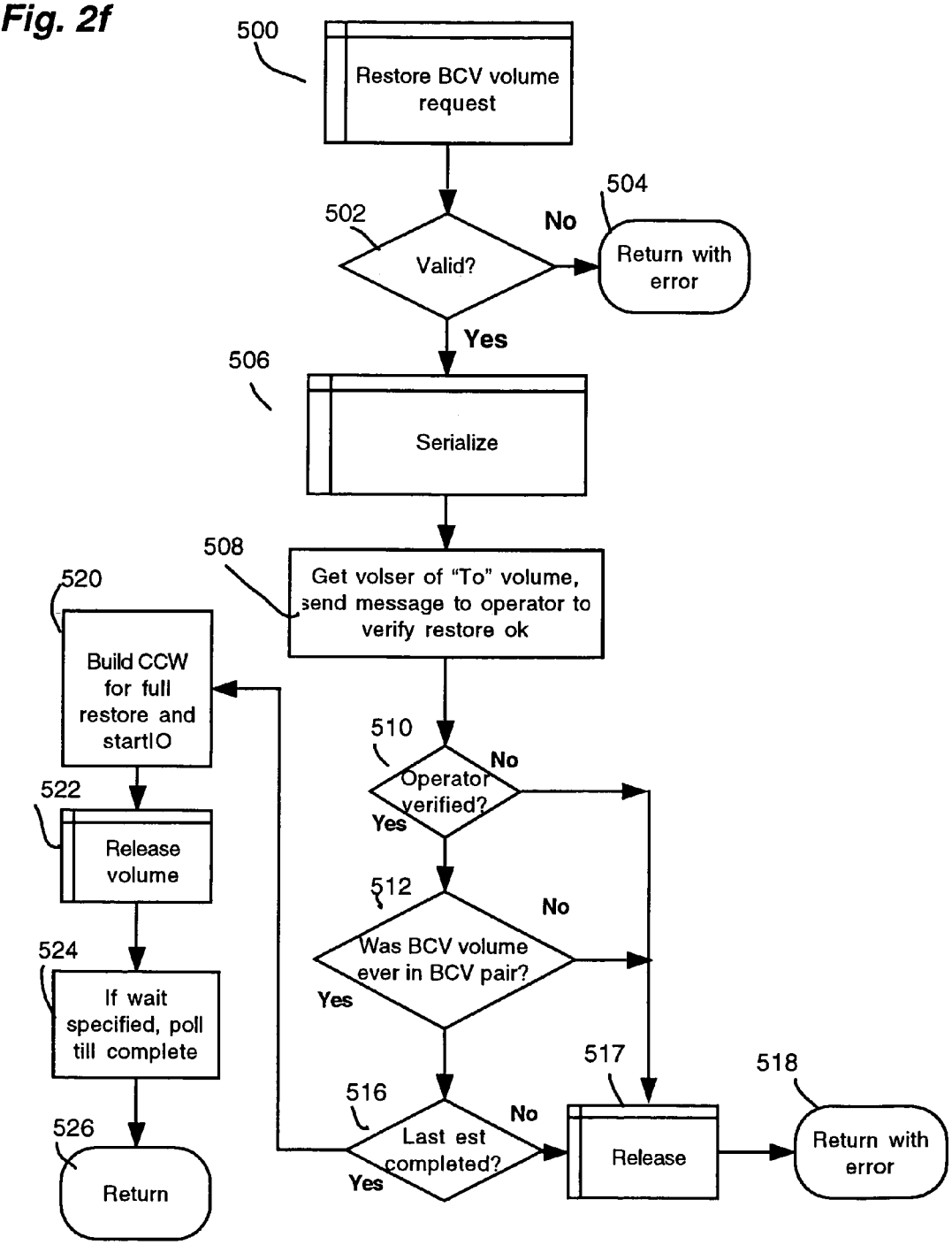
FIG. 2f is a flow diagram of the restore command of the present invention.

FIG. 2f's flow diagram illustrates the restore command's process. For a restore, the validity checking at step 502 of FIG. 2f includes the usual syntax checking but will also insure that the standard volume specified by the user in the restore command is at least the same size as the BCV volume. At step 506, time maker function TF serializes access, and at 508, time maker function TF gets the volume serial number of the standard volume, the one "to" which the restore is being made, from mass subsystem 10. In a preferred embodiment, a message is sent to the operator to verify that it is ok to restore to this volume. In the MVS operating system a write to operator with reply macro is used, so that the operator's reply can be verified at step 510. If the operator replied in the negative, time maker function TF releases access and returns at steps 517 and 518 with an error code. If the operator approved the restore, time maker function TF proceeds to step 512. While a restore can be made to a standard volume that has never been paired to a BCV volume, the BCV volume must have once been part of a BCV pair. This is checked at step 512. In a preferred embodiment, the user can create a new BCV pair just by restoring to a volume. Time maker function TF next checks at step 516 to make sure the last establish (or restore) completed. If it did not, a release is done at step 517 and an error is returned at step 518. If it did complete, time maker function TF builds a channel command word CCW at step 520 for a full restore and sends it to mass storage subsystem 10 with a startio command. Once the action has been started by mass storage subsystem 10, time maker function TF releases the volume at step 522. If the user had requested a wait, time maker function TF will poll mass subsystem 10 until the restore is complete, at step 524. Otherwise, time maker function TF returns at step 526.

The restore function sent by time maker function TF in the channel command word CCW created at step 520 causes mass storage subsystem 10 to assign the BCV volume as the next available mirror of the standard volume and copy the contents of the BCV volume to the standard volume and all of its other mirrors.

In a preferred embodiment, an incremental restore feature is also available for volumes that were once part of the same BCV pair, and then were split. It works essentially the same as the restore operation described in FIG. 1h, but with an additional time-saving exception. In an incremental restore, mass storage subsystem 10 copies from the BCV volume 30b of FIG. 1h only the new data that was updated on the BCV volume 30b(20am3) while the pair was split. Any changed tracks on the standard device(s) 20am1 and 20am2 are also overwritten by the data on the corresponding track on the BCV device.

Figure 2G:
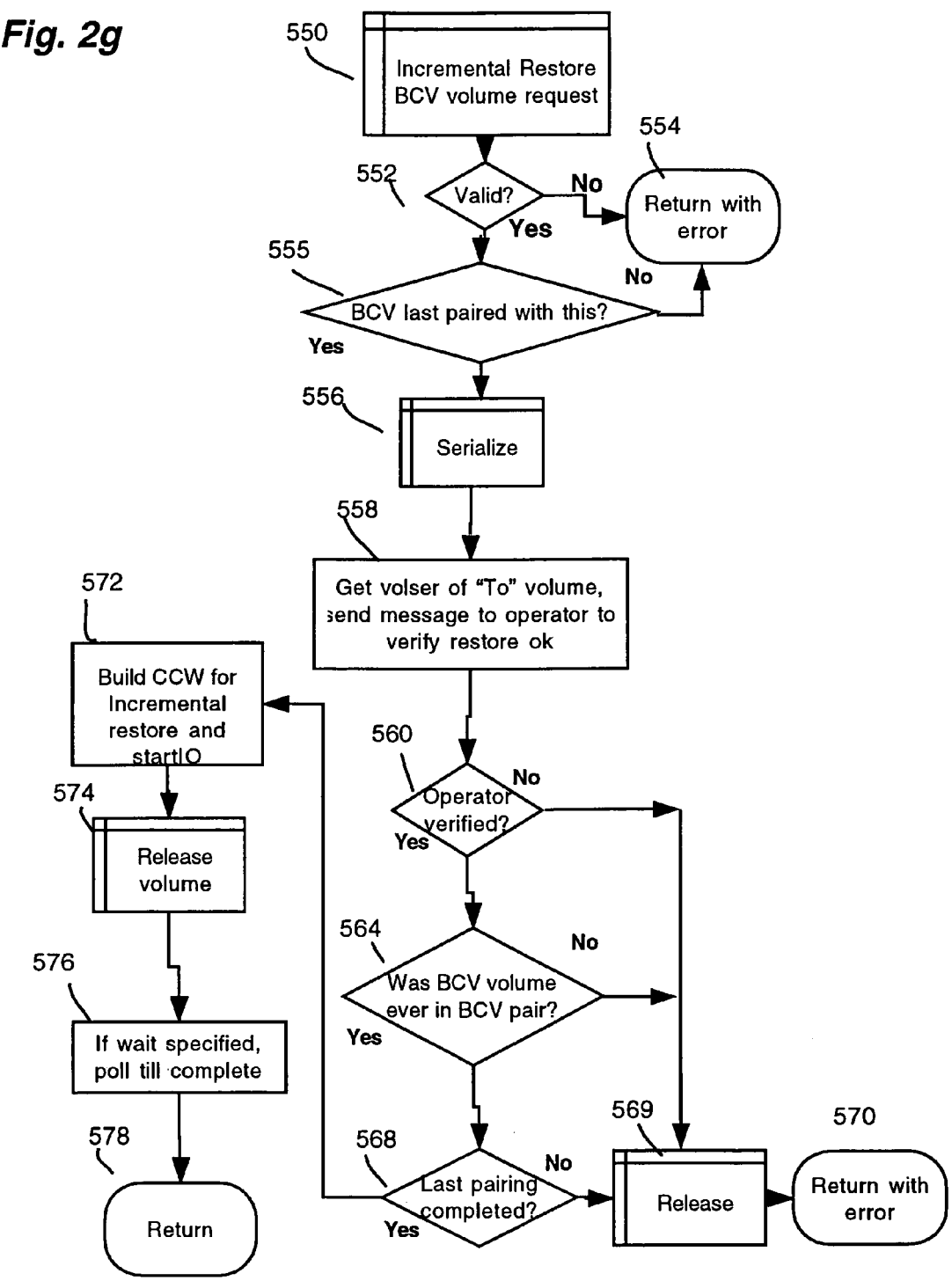
FIG. 2g is a flow diagram of an incremental restore command of the present invention.

Time maker function TF processing for an incremental restore is shown in flow diagram form in FIG. 2g. Here, the validity checking at steps 552 and 555 rejects the command if the BCV volume and the standard volume are not the same size or were not previously paired. Processing at steps 556-560 is similar to the restore command. At step 564 time maker function TF checks to see if the BCV volume was ever established or restored and at step 568 to see if the last establish or restore completed. If it did, a channel command word CCW for an incremental restore is built and sent to mass storage subsystem 10 by the startio command. This causes mass storage subsystem 10 to copy any new data that had been written to the BCV volume while the BCV pair was split to the standard volume as well as any changed tracks on the standard volume to be restored from the BCV volume. Incremental restore is useful if the results from running a new application or new version on the BCV volume were successful and the user wants to port that new data and the new version to the standard volume. At step 574, time maker function TF releases the volume once the command has been initiated by mass storage subsystem 10, and then, at step 576, polls mass storage subsystem 10 if a wait has been requested.

Figure 2H:
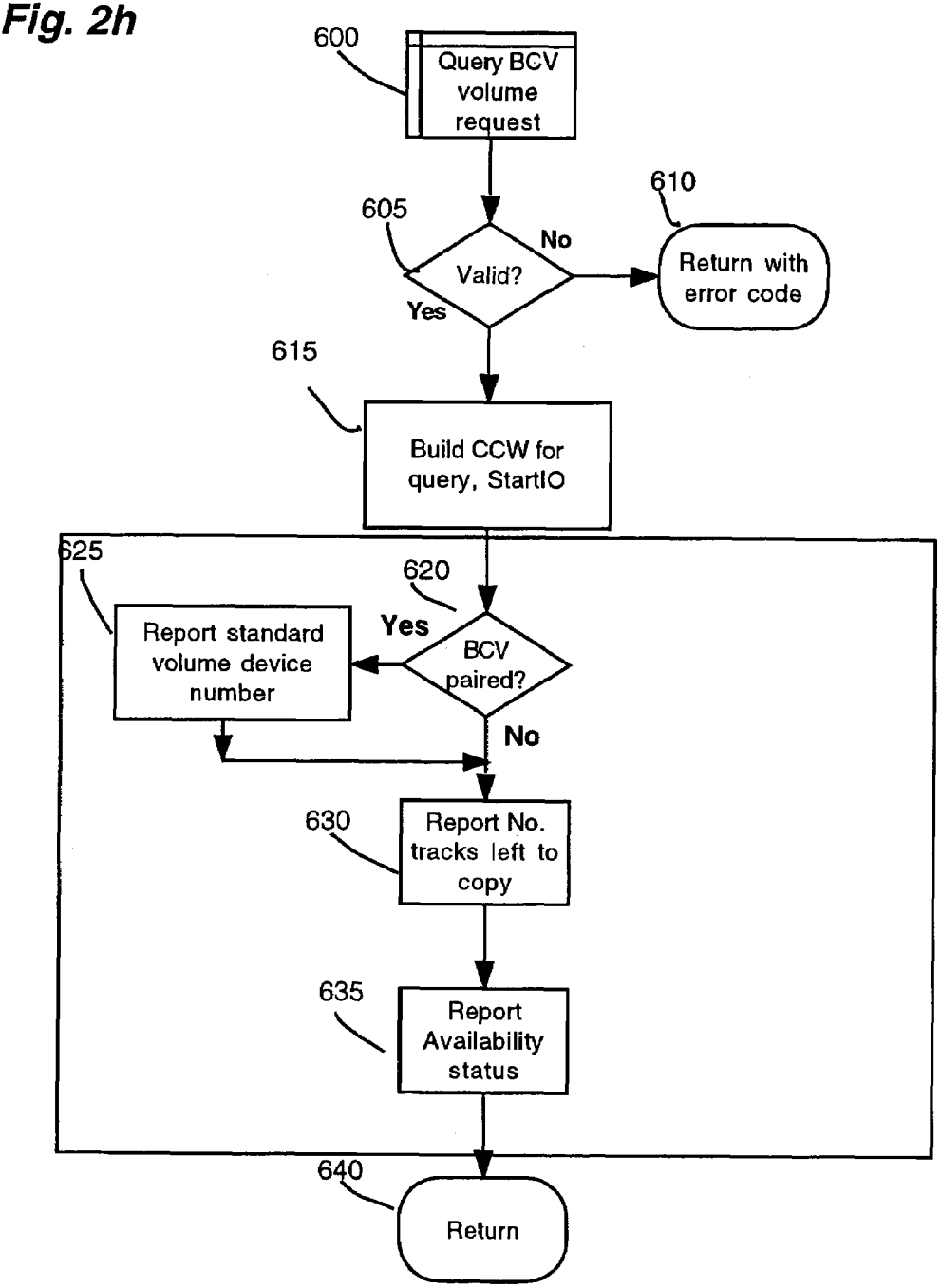
FIG. 2h is a flow diagram of the query command of the present invention.

In a preferred embodiment, time maker function TF also includes a query command, which provides information about the status of the BCV volumes in mass storage subsystem 10. The flow diagram in FIG. 2h illustrates the types of information which is provided. As with other commands, once the request is received, here at step 600, it is validity checked at step 605. Time maker function TF builds a channel command word CCW for a query command at step 615 and sends it to mass storage subsystem 10. Steps 620-635 are performed by mass storage subsystem 10. If the BCV volume is part of a BCV pair, as verified at step 620, mass storage subsystem 10 returns the device number of the BCV volume and the standard volume to which it is paired.

Finally, for a requested BCV volume, the query command causes mass storage subsystem 10 to report availability status for the requested devices at step 635. In a preferred embodiment, the state can be one of the following:

BCV volume available for use and never paired—only the BCV volume device number is valid;

BCV volume available for use and last paired to the standard volume whose number was returned and had been fully synchronized;

BCV volume available for use and last paired to the standard device whose number was returned but was not fully synchronized;

BCV pair is established or restored, the standard volume device number is valid and the BCV mirror is fully synchronized;

BCV pair is established or restored, the standard volume device number is valid and the BCV mirror is being synchronized, an invalid track count, which is included, is accurate; or a split is in progress, and the returned standard volume device number is valid.

In addition to the above commands, a preferred embodiment of the present invention also includes volume conditioning functions which can be performed at the user's request by time maker function TF. The principal volume conditioning functions are shown in FIG. 2a. If volumes are being relabeled with new volume serial numbers, time maker function TF will change the VVDS and index VTOC data set names as indicated at block 210. It will also update the VVDS self-describing record and IXVTOC name in the VVDS as indicated at block 220. Finally, for a relabel, it also changes DSCBs (the records in the volume table of contents VTOC) as seen at block 230 to reflect the new volume serial number.

When data set names are being processed, time maker function TF will update the data set entries in the VVDS, the VTOC and VTOC index data sets as shown in FIG. 2a at blocks 235 and 240.

In a preferred embodiment, individual data sets may be affected by volume conditioning. Data sets may be recatalogued into a new catalog (seen in FIG. 2a at block 250) and can also be renamed during this process. Those familiar with the MVS operating system are aware that VSAM files require special processing when name changes occur. These include changing entries in the VVDS and VTOC and VTOC index data sets as shown at blocks 235 and 240.

Those familiar with the MVS operating system are also aware that the complexity of these conditioning functions will vary with some additional options available to the MVS user. As already mentioned, VSAM data sets differ from non-VSAM data sets in that they always require a VVDS file and a catalog. Non-VSAM data sets (that are also not SMS files) do not require a VVDS file or a catalog. However, with the MVS operating system, another set of subsystem options can apply to data sets on mass storage subsystems such as mass storage subsystem 10. These are generally grouped under the name System Managed Storage (SMS).

Figure 2I:
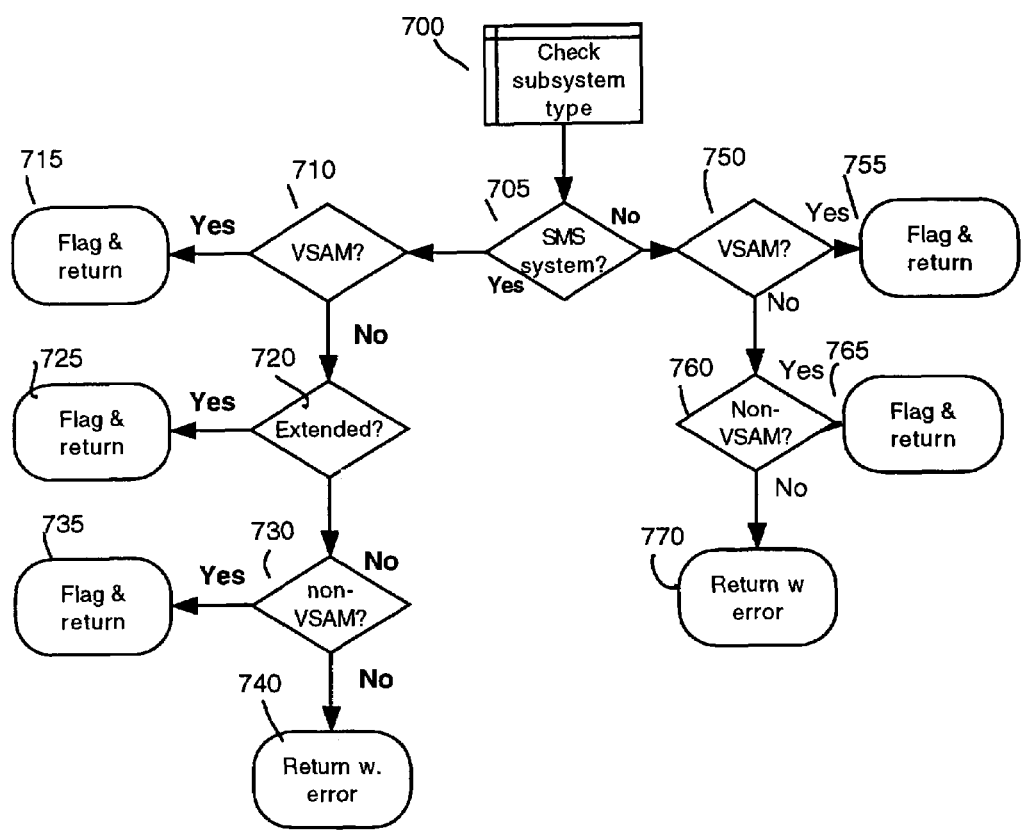
FIG. 2i is a flow diagram of check subsystem type logic according to the method and apparatus of the present invention.

In the MVS operating system, the SMS features create additional structures within some of the already mentioned structures such as VTOCs and VVDS entries, as well as adding some new structures, such as storage group volume lists and free space tables. Thus, not only must volume conditioning functions of the present invention shown in FIG. 2a determine whether a particular data set on the volume being conditioned is a VSAM data set or non-VSAM, it must make a preliminary decision, such as that shown in the flow diagram of FIG. 2i, at step 705—namely, SMS or non-SMS? Within SMS data sets, a new category, "extended", must also be handled, as seen at step 720 of FIG. 2i. Generally, SMS data sets will have more data stored about them in other system structures, such as VTOCs, VVDSs, etc. The volume conditioning features of the present invention are aware of these requirements and when changes are made to SMS data sets, the additional data is stored as appropriate. In a preferred embodiment, time maker function TF also allows a user to specify model statements for the IDCAMS utility of SMS. The time maker function TF utility program calls the IDCAMS utility of the MVS operating system, as needed, to make the changes in the SMS data set structures.

Now turning to FIG. 3a, the general command syntax for the principal BCV commands of time maker function TF is shown. As seen in table 800, for each of the principal BCV command actions, four options are available: seq#, cuup, cuus, and WAIT or NOWAIT. At line 804 of table 800, in FIG. 3a, for example, the establish command can specify a sequence number seq#, which can be a decimal number from 1 to 128 which indicates in what order the specified command is to be executed. All actions on the same sequence level are executed in parallel. As is also seen at line 804, an establish command requires the specification of a standard volume or range of volumes cuup or cuup-cuup, where cuu indicates a device number on a particular controller in mass storage subsystem 10. The establish command also requires the specification of one or more BCV volumes cuus, either as a single volume device number or a range of device numbers. In a preferred embodiment, these parameters are positional and separated by commas as will be seen in examples below. Those skilled in the art will appreciate that different command formats could be used, including keyword formats or graphical user interface formats.

Still in FIG. 3a, a user may choose to wait for the command to complete, as indicated for all the commands in table 800, except the query command. Depending on the command being performed and the load on the overall system, this may be a lengthy time. (Note, however, that even though it may take a long time for a BCV action to complete, the time is not taken away from business applications using the data sets involved, as described above, since the operation is transparent to the business applications.) If the user prefers not to wait for the completion of a given action, then NOWAIT can be specified. For NOWAIT, when time maker function TF sends the request to the applicable controller in mass storage subsystem 10 and it begins to act on it, the command is considered complete, even though mass storage subsystem 10 may take some time to fully process it. In a preferred embodiment, when NOWAIT is selected, a query command can be specified to track the progress of the action.

Remaining in FIG. 3a, in a preferred embodiment, instead of specifying a device number in the cuup, cuus formats, a data set name DSN can be specified as DSN=datasetname. If the data set so identified spans multiple volumes, the action will be performed on all the volumes. All the extents of a data set must reside on volumes managed by one mass storage subsystem 10.

In a preferred embodiment of the present invention, an additional feature allows a user to define a number of BCV volumes as a BCV group. A BCVgroup statement specifies the name of the BCV group and the controller that contains the BCV volumes. The BCVlist statement specifies the list of BCV devices in mass storage subsystem 10 that are contained in the group. The group information can also be stored in a data set that is input to the commands. Thus, as seen in the text 812 for command syntax, an establish BCV command can designate a BCVgroup of devices.

Similarly, in text 812, of FIG. 3a, a global command allows a user to specify default values for the principal BCV commands. In a preferred embodiment, the global option can set the default for the WAIT/NOWAIT option, for the maximum return code, for search disable and for a debug feature. The default value for WAIT/NOWAIT is WAIT for completion of all commands. In a preferred embodiment, only one global command is allowed. Consequently, in a preferred embodiment, if a WAIT/NOWAIT option is also specified at a command level it will override the global setting. Specifying WAIT at either the global or command level indicates that the action must complete before the command is considered done. If there are multiple commands at a sequence number seq# level, all wait conditions must be satisfied before the next level can be executed.

Still in FIG. 3a, text 812, a global command can also specify a maximum return code accepted for continuation of processing. In a preferred embodiment, when time maker function TF returns an informational message it sets a return code of zero (0). Warning messages set a return code of four (4) and error messages set a return code of eight (8). Thus, if a user is willing to accept some warning messages, a global command might set maximum return code MAXRC to 4, indicating that return codes of 4 or less are acceptable, but processing should not continue if return codes greater than 4 occur.

Turning now to FIG. 3b, an example of multiple commands is shown. As indicated at line 902, the example establishes multiple BCV volumes, waits for them to synchronize, then splits them in preparation for backups, calls a user routine using another feature of the present invention known as USEREXIT, and then re-establishes the devices when backups are completed.

Line 904 is an MVS job control statement identifying this as a job named EMCBKUP. Line 906 causes time maker function TF's customer interface to the mass storage system 10 facility EMCTF to be executed. In a preferred embodiment, time maker function TF is comprised of a number of modules—the principal BCV commands are carried out by the EMCTF module, while other functions are carried out by other modules. Those skilled in the art will appreciate that there are a number of ways time maker function TF could be organized without deviating from the spirit of the present invention.

Still in FIG. 3b, at line 908 a customary output device is identified by this JCL statement. Any messages or other printouts created by the present invention will appear on the MVS operating system's SYSOUT device.

Next, in FIG. 3b, at line 910, the SYSIN DD statement indicates that the commands for the present invention follow. The first command appears at line 912 and is a global command, specifying that the default for all other commands is WAIT and that the maximum acceptable return code is 04. At line 914 the first action BCV command appears and is a query command, at sequence number seq#1, for BCV device 100. A query can be limited to one or a few devices, but in a preferred embodiment, if no limits are specified, the status for all is returned. If there are no BCV volumes on a control unit, a return code of 4 or higher is returned. Query commands are useful for checking status online, and even in batch mode they provide useful log data for system administration.

Returning to FIG. 3b, at line 916, an establish command is shown. It has sequence number seq#2, which indicates that it will be processed with the others of the same level. The establish command of line 916 also specifies as the BCV volume device number 140, and identifies the standard volume device number as 100. As mentioned above, all the commands at the same level are executed in parallel. Thus, the next three establish commands at lines 918, 920 and 922, respectively, will also be executed along with the establish command at line 916. Since, in this example, the global command set WAIT as the default option, time maker function TF will not proceed to the next level of commands until all four establish commands have completed. As described above, time maker function TF sends the commands to mass storage subsystem 10 where a command acknowledgement is sent immediately if the operation is successfully started. In this example, with the WAIT option specified, time maker function TF will poll mass storage subsystem 10 until each establish is completed in its entirety before proceeding to the next level of commands.

Next, in FIG. 3b, at line 924 another query command is executed to track the status of the previous level of commands. This provides useful log data.

Still in FIG. 3b, once it has been verified that the BCV volumes are in synchronization (since WAIT was specified, the establish commands will have to have reached this point by now), at line 926 the first of four split commands at the same level sequence number seq#4 is given. The split commands split off each of the BCV volumes that were just synchronized, so they can be used as backups. At line 934 another query command is issued to track the completion of the split operations.

Next, at line 936 another feature of a preferred embodiment of the present invention is included—the USEREXIT command. In a preferred embodiment, a USEREXIT command allows the user to cause time maker function TF to pass control to a user written program when this command is executed by time maker function TF. In the example of FIG. 3b, the name of the user written program is WAIT-BKUP and it is executed when time maker function TF reaches commands at sequence number seq#6. In the example of FIG. 3b, this user program might signal the operator to use these four split volumes as input to a disaster recovery backup job that the operator starts separately. The program can then wait for an operator reply indicating that the backups have successfully completed. In a preferred embodiment, USEREXIT routines must specify in register 15 an exit return code when they return control to time maker function TF. This return code will also be checked against the maximum return code value MAXRC specified in the global command.

In the example of FIG. 3b, if the USEREXIT program executed at line 936 returns an acceptable return code value, the next four lines, 938, 940, 942 and 944 are re-establish commands that will re-establish the recently split BCV volumes as part of their original BCV pairs. A final query command at line 946 can perform a last status check to provide the user with confirmation that the re-establish commands were also successful.

Thus, in the example of FIG. 3b, the present invention enabled four BCV volumes to be paired and synchronized with standard volumes so that their contents were identical. They were then split off to allow another backup program to make disaster recovery backups. Finally, the re-establish commands reconnect the BCV volumes to their original BCV pairs and bring them to current status. All of this is done without disrupting or taking time away from business applications using the standard volumes.

Now with reference to FIG. 3c, another example of the use of the present invention is shown. As noted at line 1000, the example in FIG. 3c splits up a BCV pair, thus separating the backup device for use in a disaster recovery disk to tape backup, and then rejoins the BCV pair. In this example there is one job, named EMCBKUP, with three job steps. The first job step, identified by the EXEC PROGRAM=EMCTF statement in line 1006, executes time maker function TF's EMCTF module to split off BCV volume 140. The second job step of FIG. 3c at line 1018 executes a disaster recovery backup program FDRDSF, to take the BCV volume which was split off in the first step (and is identified here as Disk1 at line 1020) and copy it to magnetic tape, as indicated by the next data definition (DD) statement TAPE at line 1022. Once that step completes, the third job step executes time maker function TF again at line 1032, in the EXEC PROGRAM=EMCTF statement.

In a preferred embodiment, some of the commands for the volume conditioning functions of the present invention described above are illustrated in FIG. 3d. Here, at line 1102, a utility module of time maker function TF is executed to perform the conditioning.

Figures 5, 6:
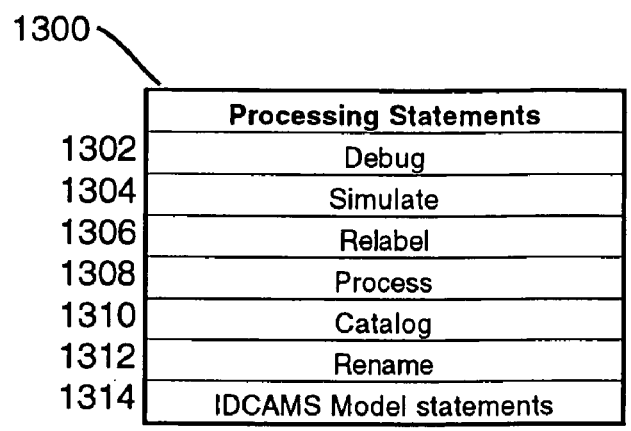
FIG. 5 is a block diagram listing the volume conditioning statements of the present invention.
FIG. 6 is a block diagram of a channel command word.

Now with reference to FIG. 5, the volume conditioning statements of the present invention are shown. The debug statement at line 1302 enables reporting of debugging information for technical support purposes. Debug information includes such things as IDCAMS output messages, error codes, actions to be done, etc. The simulate statement, at line 1304 allows a user to check out the conditioning statements before actually applying them to the disks involved. When a simulate statement is included anywhere in a set of conditioning statements, no actual changes will be made to catalogs, VVDS's or VTOC's but the return codes and error messages, if any, which would have occurred for that set of conditioning statements are provided. A relabel statement, as indicated at line 1306, changes the volume serial of the BCV volume. This is useful for BCV volumes after a BCV pair splits. In a preferred embodiment, the relabel statement relabels the BCV device by updating the VVDS and index VTOC names, updating the VVDS name entry and updating the data set control block DSCB to reflect the new volume serial number. In a preferred embodiment, if a relabel statement is specified for a unit which is online and already has the new volume serial number, a message to that effect will be logged and the relabel ignored for that volume.

Still in FIG. 5, the next conditioning statement is a process statement, as seen at line 1308. In a preferred embodiment, the process statement selects a volume for processing. Both VSAM and non-VSAM datasets on these volumes can be recatalogued and renamed. As required, VVDS entries and dataset control blocks DSCBs will be updated to reflect the new catalog information and the new data set names.

Still in FIG. 5, a catalog statement is provided to specify a catalog or set of catalogs that will be used during the process statement. As mentioned above, depending on the types of options involved for the volumes on mass storage subsystem 10 (SMS versus non-SMS, VSAM data sets versus non-VSAM data sets, etc.) different types of catalogs and catalog entries will be affected by process statements. The catalog statement also identifies new catalogs to be created via the new parameter and catalog entries to be removed if the cleanup option is specified. The cleanup feature is useful, for example if the user has already split a volume once, used it for testing, wants to do the same thing week later. With the cleanup option, the old entries will be removed.

Still in FIG. 5, it can be seen at line 1312 that a rename statement is available in a preferred embodiment. This allows a user to select a data set or series of data sets to be renamed, and allows the user to specify the prefix used for the old data set name, as well as the old name and to request that it be renamed to a new prefix and name. If a new name is not specified the existing data set will be recataloged using the old prefix and name. In a preferred embodiment, time maker function TF utility also checks to insure that if a data set is named, either a catalog has been specified for reflecting these changes or the present invention will use the default catalog for data sets provided by MVS. In a preferred embodiment multiple operations of relabel, process, catalog and rename can be specified for one execution of the time maker function TF utility.

Also in FIG. 5, in a preferred embodiment, for SMS systems, time maker function TF utility enables a user to specify parameters for handling SMS-specific variations of these conditioning features, by using IDCAMS model statements. Those skilled in the art are aware that the IDCAMS utility from IBM is a program that is used to specify and maintain SMS features such as pooling of volumes and managing storage classes within a pool. In a preferred embodiment, IDCAMS model statements are provided to time maker function TF's utility program to allow it to call the IDCAMS utility to effect some of the changes. As an example, where SMS options are used, a user may have what are called "clusters" of VSAM data sets, or lists of non-VSAM devices that are organized by some pooling scheme of SMS. Using the IDCAMS utility enables the present invention to adjust the relevant disk structures used by SMS—such as VSAM clusters.

In a preferred embodiment, whether SMS or non-SMS data sets are being conditioned, when time maker function TF's volume conditioning utility is processing a specific data set, a catalog lookup is performed. If the data set is not cataloged, then it is assumed to be a single volume data set and processing continues. If the data set is cataloged, then the list of volumes for the data set currently catalogued is used to determine whether this is a multi-volume data set. If the currently cataloged data set only resides on one volume, then it is assumed that the data set being processed is also a single volume data set and processing continues. However, if the currently catalogued data set is a multi-volume data set, it is assumed that the data set being processed is also a multi-volume data set. The volume list from the currently catalogued data set is used to determine the order and list of volumes for the data set being processed. If this data set segment does not map to the first volume in the volume list, then processing of this data set segment will stop. If this data set segment does map to the first volume in the volume list, then time maker function TF utility checks that each of the original volumes maps to a volume currently being processed. If any of the original volumes do not map to a volume currently being processed, then processing of this data set will stop. Once all of the new volumes have been determined, the data set will continue to be processed. In a preferred embodiment, all of the data set segments will be processed at once.

FIG. 3d illustrates the JCL and commands used to execute the time maker function TF utility module EMCTFU to relabel, catalog, and rename several BCV volumes that have been split off from BCV pairs. The new volume serials, names and catalog entries can be used by a test program, for example, to work with the split off volumes under the new names and serial numbers.

Referring now to FIGS. 4a through 4g, the syntax formats for the BCV commands of a preferred embodiment of the present invention are shown. FIG. 4a, for example, shows three different syntax formats for an establish command.

Line 1200 identifies the single volumes involved by volume device number. Line 1202 shows the format used to identify a range of standard and BCV volumes. Line 1204 illustrates the syntax used when identification is by data set name DSN. Most of the other BCV commands can have these syntax variations as well. FIGS. 4*c* through 4*f* show the single volume format for these. Note that the restore command and the split command have some additional options. For restore, as seen in FIG. 4*d*, a verify option (required for a full restore) allows the user to specify that the operation is to be verified either by volume serial or fixed block device FBADEV format. In this command, the verify insures that the volume serial specified for the restore is the same as the volume serial of the device specified by the cuup standard volume identifier.

Similarly, in FIG. 4*e*, the split command has a FORCE|NOFORCE option. The FORCE option, in a preferred embodiment, allows a user to split a BCV pair during an establish or restore operation—meaning that invalid tracks will exist on the device. NOFORCE allows the user to specify that the BCV pair may not be split until the establish or restore command is complete. NOFORCE is the default value for a split command.

Those skilled in the art will appreciate that while a preferred embodiment of the present invention is directed to handling mass storage disk volumes connected to host systems, other types of writeable storage media requiring backup and restore features could also be handled by the method and apparatus of the present invention.

In a preferred embodiment, time maker function TF is written in assembler language for IBM mainframes using the MVS operating system. Those skilled in the art will appreciate that it could also be written in other languages, such as C or C++, for example. Similarly, while the present invention is designed for use with the MVS operating system, those skilled in the art will appreciate that variations of it could be implemented for other operating systems such as UNIX™, NT™, and others without deviating from the spirit of the present invention.

Those skilled in the art will appreciate that the embodiments described above are illustrative only, and that other systems in the spirit of the teachings herein fall within the scope of the invention.

What is claimed is:

1. An apparatus for managing business continuance operations from a host computer having a mass storage subsystem with business continuance volume features and at least two volumes, comprising a time maker function command processor executing in said host computer for parsing and implementing business continuance volume commands in order to transmit signals to and receive signals from said mass storage subsystem, to activate said business continuance volume features without disrupting business application processing.

2. The apparatus of claim 1, wherein said business continuance volume commands further comprise syntax to allow a user to identify standard volumes and business continuance volumes on said mass storage subsystem.

3. The apparatus of claim 1, wherein said business continuance volume commands further comprise a query command for reporting on the status of business continuance volumes in said mass storage subsystem.

4. The apparatus of claim 1, wherein said signals are inserted in a channel command word and sent by a startio instruction to said mass storage subsystem.

5. The apparatus of claim 1, wherein said business continuance volume commands include volume conditioning statements to place business continuance volumes in condition for other uses.

6. The apparatus of claim 5, wherein said volume conditioning statements include a relabel statement for changing the label on a volume.

7. The apparatus of claim 5, wherein said volume conditioning statements include a process statement for selecting volumes on which to operate.

8. The apparatus of claim 5, wherein said volume conditioning statements include a rename statement for renaming data sets.

9. The apparatus of claim 5, wherein said volume conditioning statements include a simulate statement for simulating the effect of other volume conditioning statements without making actual changes.

10. A method for managing business continuance operations from a host computer having a mass storage subsystem with business continuance volume features and at least two volumes, comprising the step of executing in said host computer a time maker function command processor for parsing and implementing business continuance volume commands in order to transmit signals to and receive signals from said mass storage subsystem to activate said business continuance volume features without disrupting business application processing.

11. The method of claim 10, wherein said step of parsing and implementing business continuance volume commands further comprises the step of parsing syntax to allow a user to identify standard volumes and business continuance volumes on said mass storage subsystem.

12. The method of claim 10, wherein said step of parsing and implementing business continuance volume commands further comprises the step of implementing a query command for reporting on the status of business continuance volumes in said mass storage subsystem.

13. The method of claim 10, wherein said step of parsing and implementing further comprises the step of inserting signals in a channel command word sent by a startio instruction to said mass storage subsystem.

14. The method of claim 10, wherein said step of parsing and implementing business continuance volume commands includes the step of implementing volume conditioning statements to place business continuance volumes in condition for other uses.

15. The method of claim 14, wherein said step of implementing volume conditioning statements includes the step of implementing a relabel statement for changing the label on a volume.

16. The method of claim 14, wherein said step of implementing volume conditioning statements includes the step of implementing a process statement for selecting volumes to be operated on.

17. The method of claim 14, wherein said step of implementing volume conditioning statements includes the step of implementing a rename statement for renaming data sets.

18. The method of claim 14, wherein said step of implementing volume conditioning statements includes the step of implementing a simulate statement for simulating the effect of other volume conditioning statements without making actual changes.

19. A business continuance operations management system comprising:

a host computer having a mass storage subsystem and a command processor; and a business continuance volume command activation device for parsing business continuance volume commands and transmitting signals to the mass storage subsystem and receiving signals from the mass storage subsystem to activate business continuance volume features associated with the mass storage subsystem without disrupting business application processing on the host computer.

* * * * *